US012386305B2

(12) United States Patent
Ding et al.

(10) Patent No.: US 12,386,305 B2
(45) Date of Patent: Aug. 12, 2025

(54) DEVELOPING CARTRIDGE AND ELECTRONIC IMAGING APPARATUS

(71) Applicant: Zhuhai Ninestar Information Technology Co. , Ltd., Zhuhai (CN)

(72) Inventors: Geming Ding, Zhuhai (CN); Tiansheng Peng, Zhuhai (CN); Hao Yang, Zhuhai (CN); Shuchun Dai, Zhuhai (CN); Likun Zeng, Zhuhai (CN)

(73) Assignee: Zhuhai Ninestar Information Technology Co., Ltd., Zhuhai (CN)

( * ) Notice: Subject to any disclaimer, the term of this patent is extended or adjusted under 35 U.S.C. 154(b) by 0 days.

(21) Appl. No.: 18/735,370

(22) Filed: Jun. 6, 2024

(65) Prior Publication Data

US 2024/0402644 A1 Dec. 5, 2024

Related U.S. Application Data

(63) Continuation of application No. 18/183,751, filed on Mar. 14, 2023, now Pat. No. 12,038,714, which is a (Continued)

(30) Foreign Application Priority Data

Aug. 27, 2019 (CN) ......................... 201921406009.7
Aug. 28, 2019 (CN) ......................... 201921418173.X
(Continued)

(51) Int. Cl.
*G03G 21/16* (2006.01)
*G03G 21/18* (2006.01)

(52) U.S. Cl.
CPC ..... *G03G 21/1647* (2013.01); *G03G 21/1821* (2013.01); *G03G 21/1857* (2013.01);
(Continued)

(58) Field of Classification Search
CPC ............. G03G 21/1647; G03G 21/186; G03G 21/1864; G03G 2221/1657; G03G 21/1896
See application file for complete search history.

(56) References Cited

U.S. PATENT DOCUMENTS 6,298,202 B1 * 10/2001 Fushiya ............. G03G 21/1896 399/113
9,535,396 B2 * 1/2017 Shimizu ............. G03G 21/1647
(Continued)

FOREIGN PATENT DOCUMENTS

CN 201514542 U 6/2010
CN 205003445 U 1/2016
(Continued)

OTHER PUBLICATIONS

The World Intellectual Property Organization (WIPO) International Search Report for PCT/CN2020/111148 Nov. 11, 2020 4 Pages (including translation).
(Continued)

*Primary Examiner* — Francis C Gray
(74) *Attorney, Agent, or Firm* — Anova Law Group, PLLC

(57) ABSTRACT

A developing cartridge includes: a cartridge containing a developer and including a first side wall and a second side wall positioned opposite to each other along a first direction; a power reception member configured to receive a driving power and positioned at the first side wall; a developing roller rotatable about a first axis extending in the first direction; and an activation member including a movable member and a detection protrusion positioned at the second side wall. The movable member rotates around a second axis in a second direction, the first direction and the second
(Continued)

direction intersect with each other, and the detection protrusion moves as the movable member moves.

16 Claims, 36 Drawing Sheets

Related U.S. Application Data continuation of application No. 17/671,541, filed on Feb. 14, 2022, now Pat. No. 11,635,728, which is a continuation of application No. PCT/CN2020/111148, filed on Aug. 25, 2020.

(30) Foreign Application Priority Data

| | | |
|---|---|---|
| Sep. 4, 2019 | (CN) | 201921466131.3 |
| Sep. 5, 2019 | (CN) | 201921477153.X |
| Sep. 11, 2019 | (CN) | 201921516810.7 |
| Sep. 18, 2019 | (CN) | 201921557007.8 |
| Sep. 21, 2019 | (CN) | 201921580821.1 |
| Oct. 14, 2019 | (CN) | 201921720541.6 |
| Oct. 17, 2019 | (CN) | 201921747615.5 |
| Oct. 22, 2019 | (CN) | 201921784211.3 |
| Oct. 31, 2019 | (CN) | 201921863944.6 |

(52) U.S. Cl.
CPC ....... *G03G 21/186* (2013.01); *G03G 21/1864* (2013.01); *G03G 2221/1657* (2013.01)

(56) References Cited

U.S. PATENT DOCUMENTS

| | | | | |
|---|---|---|---|---|
| 2012/0207501 A1* | 8/2012 | Funamoto | G03G 15/5008 399/68 |
| 2015/0277353 A1* | 10/2015 | Fukamachi | G03G 21/1647 399/119 |
| 2017/0315467 A1* | 11/2017 | Bryant | B41J 2/442 |
| 2022/0171324 A1* | 6/2022 | Ding | G03G 21/186 |

FOREIGN PATENT DOCUMENTS

| | | | | |
|---|---|---|---|---|
| CN | 108089417 A | 5/2018 | |
| CN | 108983567 A | 12/2018 | |
| CN | 201170839 Y | 12/2018 | |
| CN | 111240168 A | 6/2020 | |
| CN | 107885053 B * | 8/2021 | G03G 15/0863 |
| EP | 3382466 A1 * | 10/2018 | G03G 15/0863 |
| JP | S62134654 A | 6/1987 | |

OTHER PUBLICATIONS

Notice of Allowance of CN202021065051X.
Notice of Allowance of CN2020202540804.

* cited by examiner

DEVELOPING CARTRIDGE AND ELECTRONIC IMAGING APPARATUS

CROSS-REFERENCE TO RELATED APPLICATIONS

This application is a continuation of U.S. patent application Ser. No. 18/183,751 filed on Mar. 14, 2023, which in turn is a continuation of U.S. patent application Ser. No. 17/671,541 filed on Feb. 14, 2022, which in turn is a continuation of International Application No. PCT/CN2020/111148, filed on Aug. 25, 2020, which in turn claims priority to Chinese Patent Application No. 201921406009.7, field on Aug. 27, 2019, Chinese Patent Application No. 201921418173.X, field on Aug. 28, 2019, Chinese Patent Application No. 201921466131.3, field on Sep. 4, 2019, Chinese Patent Application No. 201921477153.X, field on Sep. 5, 2019, Chinese Patent Application No. 201921516810.7, field on Sep. 11, 2019, Chinese Patent Application No. 201921557007.8, field on Sep. 18, 2019, Chinese Patent Application No. 201921580821.1, field on Sep. 21, 2019, Chinese Patent Application No. 201921720541.6, field on Oct. 14, 2019, Chinese Patent Application No. 201921747615.5, field on Oct. 17, 2019, Chinese Patent Application No. 201921784211.3, field on Oct. 22, 2019, and Chinese Patent Application No. 201921863944.6, field on Oct. 31, 2019. All of the applications are hereby incorporated by reference in their entireties.

TECHNICAL FIELD

The present application relates to the technical field of electronic imaging and, in particular, to a developing cartridge and an electronic imaging apparatus.

BACKGROUND

A developing cartridge is a detachable part widely used in an electronic imaging apparatus. The electronic imaging apparatus is provided with a driving member, for providing power to the developing cartridge; and a detect gear is further provided on the developing cartridge. When a new developing cartridge is mounted on the electronic imaging apparatus, the electronic imaging apparatus is recognized as a specific developing cartridge via an action of the detect gear and the electronic imaging apparatus, and capacity of the developing cartridge is recognized according to predetermined information in the electronic imaging apparatus, so as to reminder a user to replace the new developing cartridge when a printing life of the developing cartridge is about to expire.

For example, there has been a specific developing cartridge. FIG. 1 is a developing cartridge in the prior art, a power reception member 110 is provided with one end of the developing cartridge in a length direction, for receiving power from a driving member of the electronic imaging apparatus; and a detect gear part 150 is provided with the other end of the developing cartridge in the length direction. The developing cartridge further includes a developing roller 160, for outputting developer stored in the developing cartridge.

However, the structure of activation assemblies on the developing cartridge in the prior art is complicated.

SUMMARY

In view of the above problem, the present applicant provides a developing cartridge, which is used for an electronic imaging apparatus to detect and identify the developing cartridge.

For achieving the above purpose, embodiments of the present application provide the following technical solutions:

a developing cartridge including: a cartridge configured to accommodate developer therein, where the cartridge includes a first side wall and a second side wall, and the first side wall and the second side wall are provided opposite to each other along a first direction; a power reception member, configured to receive driving power transmitted from the electronic imaging apparatus, where the power reception member is located on the first side wall; a rotary member, installed between the first side wall and the second side wall, where one end of the rotary member is provided with a first gear, and the other end of the rotary member is provided with a second gear; the first gear is located at the first side wall, and configured to receive driving power transmitted from the power reception member; and the second gear is located at the second side wall, and configured to receive driving power transmitted from the rotary member; and an activation member, located on the second side wall which can receive driving power transmitted from the second gear; and the activation member includes a movable member and a trigger part provided on the movable member, the trigger part can trigger a detection part of the electronic imaging apparatus to recognize the developing cartridge by controlling the movable member, and the movable member moves in a translational motion or rotatable manner about the rotation axis that is not parallel to the first direction.

The movable member is a rack, and the trigger part is a protrusion provided on the rack.

A guide rail is provided on the cartridge, and the rack can move along the guide rail to enable the trigger part to trigger the detection part.

The guide rail has a bent section, and the rack is a bendable flexible rack.

The cartridge further includes an end cover and a holding member provided on the second side wall, and the end cover at least partly the second gear; the holding member has a first guide rail and a second guide rail, and the end cover has a third guide rail corresponding to the first guide rail and a fourth guide rail corresponding to the second guide rail; and a rack cover is provided on an upper cover of the rack, one side of the rack is located in the second guide rail, and the other side of the rack is located in the fourth guide rail; and one side of the rack cover is located in the first guide rail, and the other side of the rack cover is located in the third guide rail.

The rack can move along the second guide rail and the four guide rail under an action of the driving power; and the rack cover can move along the first guide rail and the third guide rail to make the rack cover to be installed in place.

The rack can move along the second guide rail and the four guide rail under an action of the driving power; and the rack cover can move along the first guide rail and the third guide rail to make the rack cover to be installed in place.

The holding member has a first groove constructing the first guide rail and a second groove constructing the second guide rail; and the end cover has a third groove constructing the third guide rail and a four groove constructing the fourth guide rail; the second groove and/or the fourth groove has a tailing edge used to restrict the rack, and the rack can move to abut the tailing edge under the action of the driving power; and the tailing edge can be a reference datum when the rack is at the initial position.

The rack cover is clamped with the cartridge; and/or, the rack cover is threaded with the cartridge.

A cantilevered buckle is provided on the second guide rail and/or the fourth guide rail, the rack is provided with a card slot matching with the buckle, when the card slot abuts with the buckle, the rack is in the initial position; and the buckle can be a reference datum when the rack is at the initial position.

The rack at least includes a first rack and a second rack, the first rack is juxtaposed in and the second rack, and the first rack and the second rack change between an unfolded state and a folded state in response to the driving power.

The first rack and the second rack are in sliding connection, the first rack is lagging behind the second rack, the second rack moves under the driving power, and then the second rack drive the first rack to connect with second gear The second gear can successively engage with the first rack and the second rack, an engaging groove and an engaging protrusion are provided between the first rack and the second rack, and the second gear drives the second rack to enable the engaging protrusion to move along the engaging groove until the engaging groove interferes with the engaging protrusion.

The movable member is a bevel gear, and the trigger part is a protrusion provided on the bevel gear.

The cartridge is provided with an intermediate transmitting member, and the trigger part can push the intermediate transmitting member under the driving of the movable member to enable the intermediate transmitting member to push the detection part.

The cartridge is further provided with a first elastic member, one end of the first elastic member is relatively fixed to the cartridge, and the other end of the first elastic member is relatively fixed to the intermediate transmitting member; and under an action of the elastic power of the first elastic member, the intermediate transmitting member moves toward a direction away from the detection part.

The intermediate transmitting member is a swing lever or a push block.

A transmission structure is provided between the second gear and the movable member, and the second gear transmits the driving force to the movable member by the transmission structure.

The transmission structure includes a first transmission part and a second transmission part, the first transmission part is configured to connect with the movable member in a transmission manner, the second transmission part is configured to connect with the second gear in a transmission manner, and the first transmission part and the second transmission part are configured to be suitable for delaying transmitting driving power transmitted to the second transmission part to the first transmission part.

The first transmission part includes a hysteresis gear provided with a first protrusion in an axial direction, the second transmission part includes a first idle gear provided with the engaging groove in the axial direction, the engaging groove is configured to form a sector with a center of a circle of the first idle gear, and the first protrusion reaches into the engaging groove and moves along a length direction of the engaging groove.

The transmission structure further includes a third transmission part used to accelerate in movement of the movable member, a transmission ratio of the third transmission part is greater than a transmission ratio of the second transmission part; and one of the second transmission part and the third transmission part is controllably connected to the second gear.

The second transmission part includes a second idle gear, the third transmission part includes a third idle gear, the second idle gear and the third idle gear are configured to rotate coaxially, and a pitch circle diameter of the second idle gear is smaller than a pitch circle diameter of the third idle gear; and the hysteresis gear is provided with a pinion portion, the pinion portion is a missing gear, the pinion portion and the hysteresis gear are provided coaxially, a pitch circle diameter of the pinion portion is smaller than a pitch circle diameter of the hysteresis gear, the pinion portion connects with the third idle gear, and the second idle gear connects with the first idle gear.

At least one of the transmission structure and the movable member includes the bevel gear.

The power reception member directly engages with the first gear.

The electronic imaging apparatus includes the developing cartridge.

Compared with the prior art, the developing cartridge provided by the embodiment of the present application has the following advantages:

The developing cartridge of the embodiments of the present application drives the detection part to move by the movable member moving or rotating around the rotation axis in the direction that is not parallel to the first direction, thereby enabling the activation member to satisfy developing cartridges with diversified structures.

In addition to the technical problems solved, the technical features constituting the technical solutions, and the beneficial effects brought by the technical features of these technical solutions in the embodiments of application described above, other technical problems solved by the developing cartridge, other technical features contained in the technical solutions, and the beneficial effects brought by these technical features provided by the embodiments of the present application will be described in further detail in the specific implementation.

BRIEF DESCRIPTION OF DRAWINGS

In order to explain the technical solutions of the embodiments of the present application more clearly, the accompanying drawings, which need to be used in the embodiments, are briefly introduced below. Obviously, the drawings described below are only some embodiments of the present application. Other drawings can also be obtained by ordinary technicians in the art according to these drawings without paying creative efforts.

DESCRIPTION OF EMBODIMENTS

In order to better understand the technical solutions of the present application, the embodiments of the present application will be described in detail as follows in conjunction with the accompanying drawing.

It should be illustrated that the embodiments described are only a part of the embodiments of the present application, rather than all of the embodiments thereof. All the other embodiments obtained by ordinary technicians in the art based on the embodiments of the present application without creative efforts shall fall within (belong to) the protection scope of the present application.

The developing cartridge of the present application will be introduced in detail below through specific embodiments.

Embodiment 1

Figure 1:
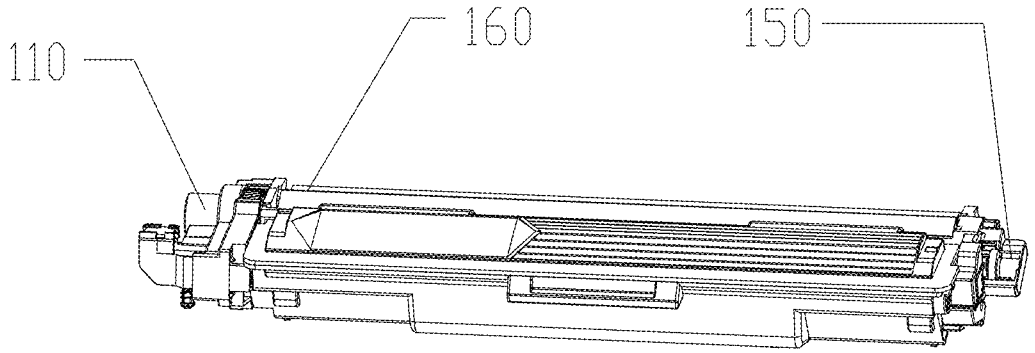
FIG. 1 is a stereoscopic view of a developing cartridge in the prior art.
Figure 2:
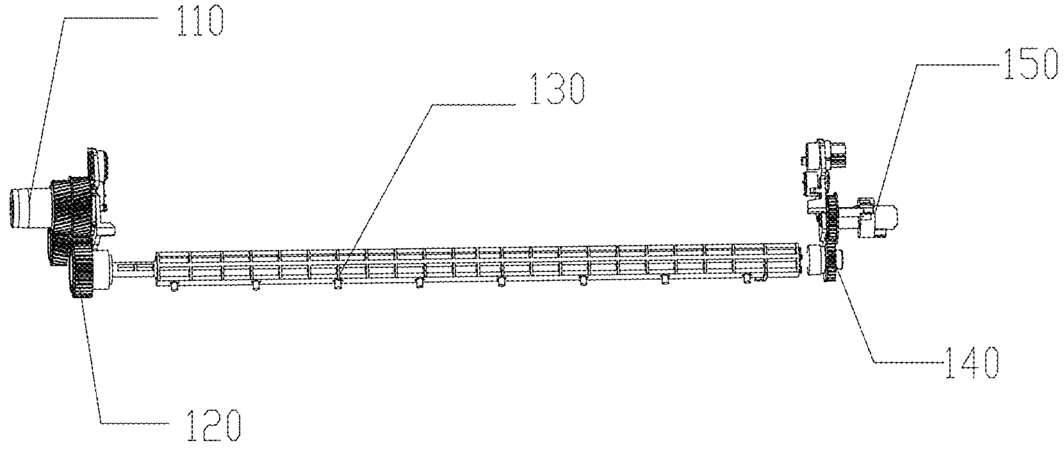
FIG. 2 is a schematic structural diagram of a transmission part.
Figure 3:
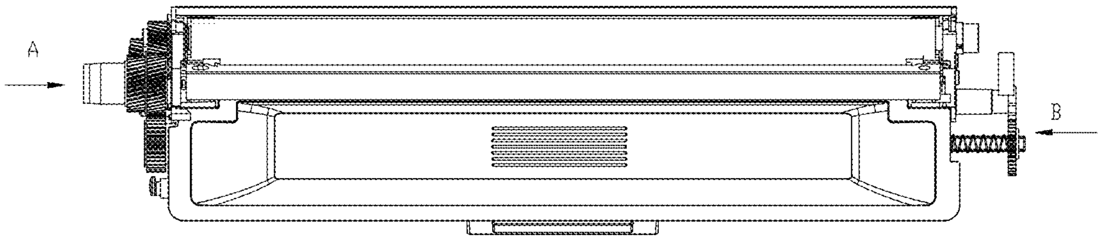
FIG. 3 is a stereoscopic view of a developing cartridge after removing an end cover in Embodiment 2.

FIG. 2 is a schematic diagram of a transmission structure of a developing cartridge in FIG. 1. For convenient display, a frame (shell) portion of the developing cartridge is removed in FIG. 1.

As shown in FIG. 2, the developing cartridge receives rotational driving power from an electronic imaging apparatus through a power reception member 110, and transmits the power to an agitator member 130 through one gear set 120 at receiving end. The agitator member 130 is located inside cartridge of the developing cartridge, rotary agitator to prevent the developer from being clumping. The agitator member 130 then transmits the rotational driving power to another gear set 140 at counting end located in the other side of the agitator member 130, and further to a detect gear 150.

In the present embodiment, the developing cartridge is divided into two parts which are an activating part and a printing part. A frame of the activating part may be provided to be similar with the structure of the developing cartridge in the prior art in FIG. 1. However, compared to the developing cartridge in the prior art, the frame of the activating part does not need to be installed with a developing roller or and does not need to store developer, it only needs to at least contain a power reception member for receiving power from the electronic imaging apparatus, a detect gear used to activate an electronic imaging apparatus to check a new developing cartridge, and a transmission part for transmitting the power from the power reception member to the detect gear. Preferably, it is possible to use the existing developing cartridge without providing the developing roller and storing the developer, and only the frame and the transmission structure in FIG. 2 are retained as the activating part.

The activating part is taken out after the activating part is activated in the electronic imaging apparatus, and a printing part is installed in the electronic imaging apparatus. The printing part does not have the detect gear 150 for activating compared with the developing cartridge in the prior art. The other part of the printing part may be set as that in the prior art. At this time, the electronic imaging apparatus recognizes the developing cartridge after being activated by the activating part, and replaces the printing part and performs a normal printing. This can avoid poor printing effect caused by the interference of the counting gear in the printing process.

When the electronic imaging apparatus prompts to replace the developing cartridge, at this time, developer remaining in the printing part is also at a low level, a new activating part and a new printing part are replaced, and it continues to follow the process of firstly activating the electronic imaging apparatus by using the activating part and then performing electronic imaging by using the printing part.

Preferably, in order to save resources, it may further design a structure of a reusable activating part, thereby selling a combination product of the activating part and the printing part as well as a product of a separate printing part.

Embodiment 2

As shown in the FIG. 3 to FIG. 7, the present embodiment provides a developing cartridge, where the developing cartridge is installed detachable in an electronic imaging apparatus, and includes a cartridge, a power reception member 210, a rotary member and an activation member.

The cartridge includes a first side wall A and a second side wall B, and the first side wall A and the second side wall B are oppositely provided along a first direction. Where the first direction is a length direction of the developing cartridge, developer accommodated in the cartridge; the power reception member 210 is positioned on the first side wall A, and used to receive driving power transmitted from the electronic imaging apparatus; the rotary member is installed between the first side wall A and the second side wall B, one end of the rotary member is provided with a first gear 221, and the other end of the rotary member is provided with a second gear 241, the first gear 221 is positioned on the first side wall A, for receiving the driving power transmitted from the power reception member 210, the second gear 241 is positioned on the second side wall B, for receiving the driving power transmitted from the rotary member; and the activation member is positioned on the second side wall B, which moves under the driving power transmitted from the second gear 241, and is detected by a detection part of the electronic imaging apparatus to recognize the developing cartridge.

The activation member includes a movable member 251 and a trigger part provided on the movable member 251, and the trigger part is driven by the movable member 251 to trigger the detection part 999 of the electronic imaging apparatus, so that the electronic imaging apparatus recognizes the developing cartridge. The movable member is a rack, the trigger part is a protrusion provided on the rack, and the structure of the rack is simple and easily to be processed. On the one hand, the structure of the activation member has been simplified, on the other hand, it is convenient to adjust the rack and the trigger part provided on the rack, so that the activation member can be adapted to different electronic imaging apparatuses.

The developing cartridge of the present embodiment is installed in the electronic imaging apparatus, the power reception member 210 receives the driving power transmitted from the electronic imaging apparatus, and sequentially transmits the driving power to the activation member through the first gear 221, the rotary member and the second gear 241, thereby driving the movable member 251 of the activation member to move, so that the trigger part provided on the movable member 251 triggers the detection part 999 of the electronic imaging apparatus and then the developing cartridge is recognized by the electronic imaging apparatus.

The trigger part may be a protrusion 252 provided on the rack, and the protrusion 252 may be integrally formed with the rack, or may also be assembled together after being separately processed; number and height of the protrusion may be set according to predetermined content in the electronic imaging apparatus to satisfy the detection requirements of the detection part of the electronic imaging apparatus; and when the number of the protrusion is at least two, the protrusions may be spaced from one another along the length direction of the rack, and the distance between adjacent two protrusions may also be set according to the predetermined content in the electronic imaging apparatus.

In other embodiments, the trigger part may further be other structure provided on the rack, as long as the detection part of the electronic imaging apparatus can be triggered under the driving of the rack, so that the developing cartridge is recognized by the electronic imaging apparatus.

The rotary member may be an agitator member, and the agitator member is used to stir the developer in the cartridge;

and in the other embodiments, the rotary member may further be a developing roller, the developing roller is used to output the developer in the cartridge, or, the rotary member may further be a powder feeding roller, and the powder feeding roller is used to output the developer for the developing roller.

Figure 4:
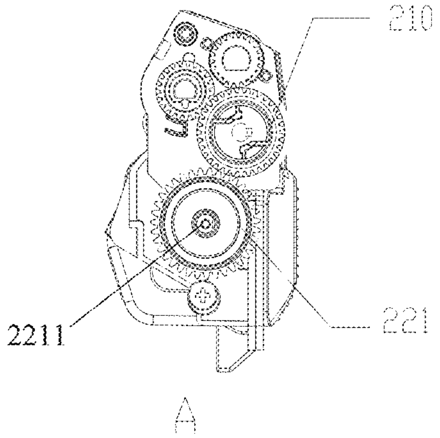
FIG. 4 is a schematic diagram of an end A of the developing cartridge viewed from a length direction of the developing cartridge in Embodiment 2.

As shown in FIG. 4, the power reception member 210 of the present embodiment directly engages with the first gear 221 located on the first side wall A, and the first gear 221 receives the driving power from the power reception member 210 and rotates about a third axis 2211 extending in the first direction. The power reception member may directly engage with the first gear, thereby not only saving the materiel cost, but also reducing the assembly difficulty and saving the assembly time.

It needs to illustrate that the electronic imaging apparatus of the present embodiment may be a structure that not only can provide electrical energy for the developing cartridge, but also perform detection on the developing cartridge. A conductive part, which can be in contact with the detection part, is provided on the cartridge, and the trigger part may trigger the detection part under the driving of the movable member 251 to separate the detection part from the conductive part.

Figure 6:
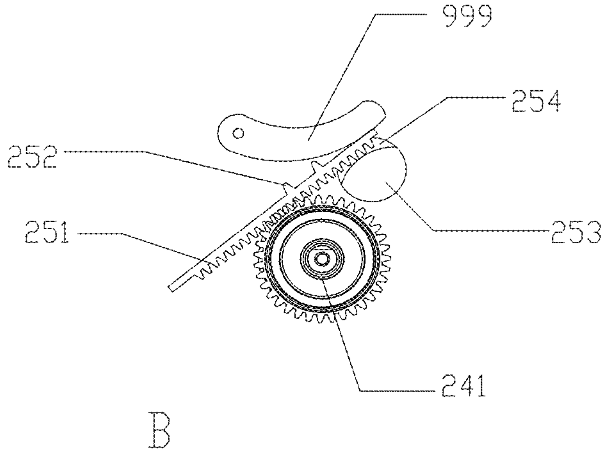
FIG. 6 and FIG. 7 are schematic diagrams of main components of the end B of the developing cartridge viewed from the length direction of the developing cartridge in Embodiment 2.
Figure 7:
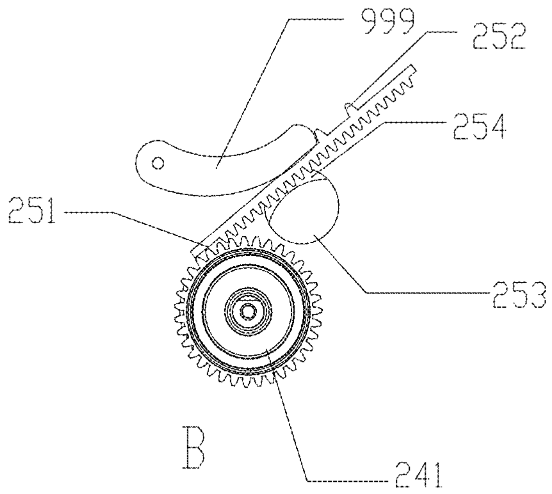

As shown in FIG. 6 and FIG. 7, the movable member 251 of the present embodiment may locate between the conductive part 253 and the detection part 999, the trigger part is provided on a side of the movable member 251 facing the detection part 999, and may push the detection part 999 under the driving of the movable member 251 to separate the detection part 999 from the conductive part 253.

Specifically, one side of the movable member 251 having a tooth part may directly engage with the second gear 241, the other side is provided with a protrusion 252 which can push the detection part 999, and the conductive part 253 receive the electrical energy transmitted from the electronic imaging apparatus through contacting with the detection part 999. Before the electronic imaging apparatus detects the developing cartridge, the positions of the movable member 251 and other components are shown in FIG. 6, at this time, at least a part of the detection part 999 is in contact with the conductive part 253 to transmit the electrical energy. When the electronic imaging apparatus starts to detect the developing cartridge, the movable member 251 is driven by the second gear 241 to move toward an upper right direction in FIG. 6, so that the protrusion 252 can push the detecting portion 999 to be separated from the conductive portion 253. As the continued movement of the movable member 251, as shown in FIG. 7, the protrusion 252 leaves the position where the detecting portion 999 separates from the conductive portion 253, so as to restore contact between the detecting portion 999 and the conductive portion 253, during this process, the movement of the detection part 999 can generate a pulse for recognition by the electronic imaging apparatus.

In the present embodiment, in order to enable the rack 251 to be more stable, have a better directionality, and not easy to fall out during the moving process. On the one hand, a groove 254 for accommodating the movable member 251 may be provided at a free end of the conductive part 253, so that a part of the movable member 251 is located in the groove 254; and on the other hand, a guide rail may be provided on the cartridge, and the movable member may move along the guide rail, so that the trigger part triggers the detection part.

The position of the rack and the protrusions on the rack may further have other settings according to actual needs, which will be described here again.

Figure 5:
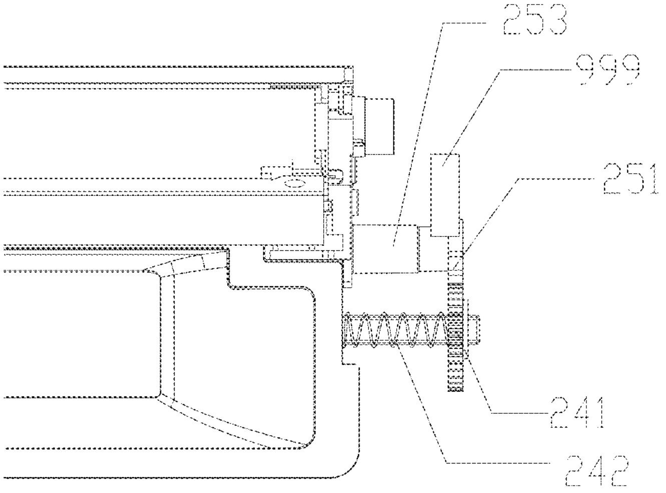
FIG. 5 is an enlarged view of an end B of the developing cartridge in Embodiment 2.

In the use of the developing cartridge of the present embodiment, there may be some situations in which the movable member 251 needs to be reset, for example, after the developer in the developing cartridge is exhausted and before refilling and putting into use, the rack needs to be reset, for example, in the process of production, the movable member 251 of the developing cartridge after being tested needs to be reset. For facilitate resetting the movable member 251 to enable the movable member 251 to restore the initial position before the detection part of the electronic imaging apparatus is triggered, an elastic member 242 may be provided on the cartridge. As shown in FIG. 5, one end of the elastic member 242 is relatively fixed to cartridge, the other end of the elastic member 242 is relatively fixed to the second gear 241, and the elastic member 242 may enable the second gear 241 to move along the axial direction.

Figure 8:
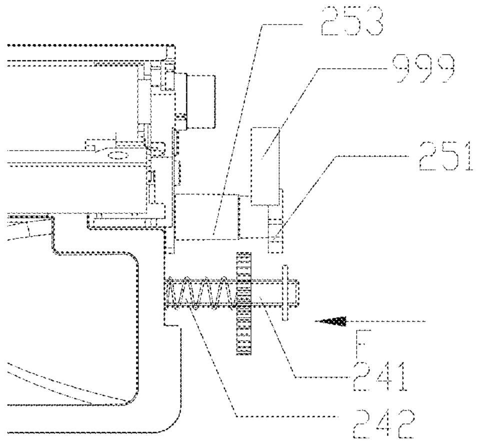
FIG. 8 is a schematic diagram of a rack when resetting in Embodiment 2.

As shown in FIG. 8, when resetting the activation member, the second gear 241 is firstly pressed in the direction of the cartridge to enable the second gear 241 to move toward the direction closing to the cartridge, so as to disengage with the movable member 251; and then the movable member 251 is pulled toward the opposite direction that the detection part 999 may be triggered, so that the movable member 251 is restored to the initial position and the second gear 241 is released. Under the pushing of the elastic member 242, the second gear 241 may restore to the position of engaging with the movable member 251, so as to complete the reset of the movable member 251. The resetting solution is simple and does not require tearing down the activation member.

Embodiment 3

The present embodiment provides a developing cartridge, and unspecified parts are the same as the structure of the developing cartridge in Embodiment 2.

Figure 9:
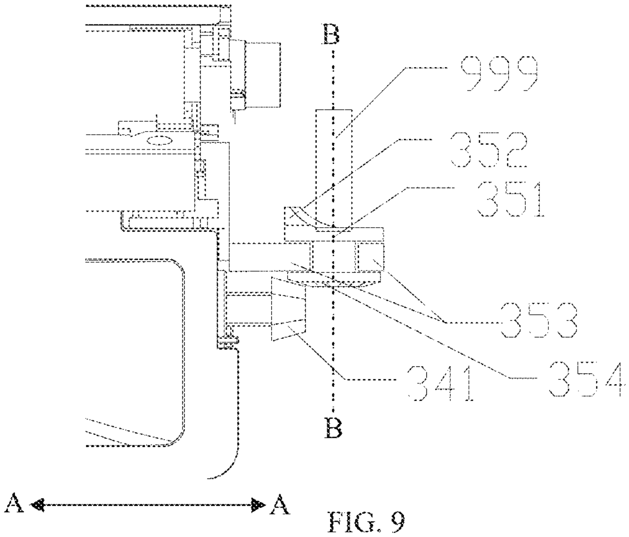
FIG. 9 and FIG. 10 are schematic structural diagrams of an end B of a developing cartridge in Embodiment 3.
Figure 10:
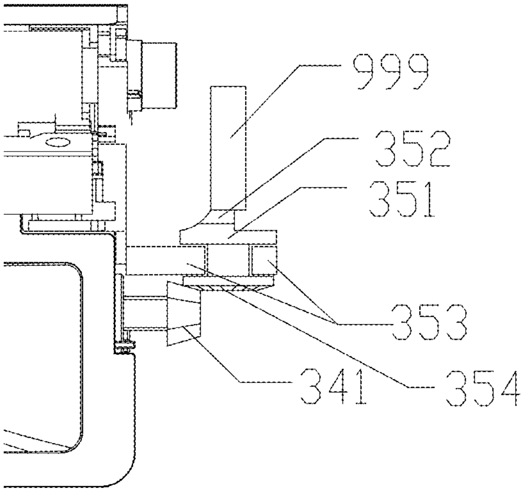

As shown in FIG. 9 and FIG. 10, the developing cartridge includes a second gear 341 and a movable member 351 engaged with the second gear 341. A bevel gear part 354 is provided at one end of the movable member 351 closing to the second gear 341, so as to receive the power from the second gear 341, that is, the movable member 351 is the bevel gear. A conducting pillar 353 restrains the movable member 351 to enable the movable member 351 to rotate around a rotation shaft (also known as a rotation axis or an axis B-B) that is not parallel to the length direction (first direction A-A) of the developing cartridge, especially rotate around a rotation shaft that is perpendicular to the first direction. A trigger part 352 is further provided at the side of the movable member 351 closing to the detection part 999. The second gear 341 is installed at a shaft end of the agitator member and rotates together with the agitator member.

After receiving the power transmitted through the agitator member, through engaging with the bevel gear part 354, the second gear 341 enables the movable member 351 to rotate. The movable member 351 may be a flexible member. The movable member 351 may be made of conductive material or insulating material. As shown in FIG. 10, with the rotation of the movable member 351, the trigger part 352 contacts and interferes with the detection part 999, to enable the detection part 999 to move and recognize the trigger part, and then the movable member 351 continues to rotate to enable the detection part 999 to avoid the trigger part 352.

Preferably, a missing tooth structure is provided on the bevel gear part 354 of the movable member 351, when rotating to a missing tooth position, the agitator bevel gear 341 may no longer drive the movable member 351. Such a design may prevent the movable member 351 from rotating all the time after the developing cartridge is recognized by the electronic imaging apparatus.

Embodiment 4

Figure 11:
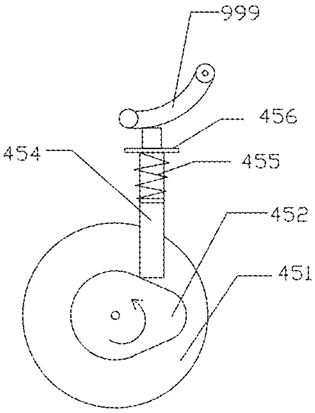
FIG. 11 and FIG. 12 are schematic structural diagrams of an activation member in Embodiment 4.
Figure 12:
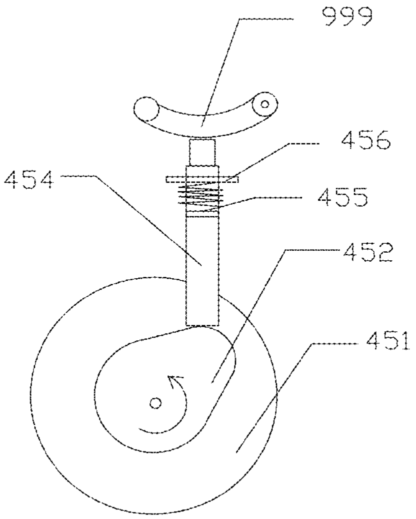

The present embodiment discloses an activation member portion located on an end B of the developing cartridge. FIG. 11 and FIG. 12 are schematic structural diagrams of an activation member in the present embodiment, and reveal a working principle of the structure in the present embodiment. All illustrated parts in the present embodiment are the same as the contents in the above embodiments, which will not be repeated for the sake of simplicity.

As shown in FIG. 11 and FIG. 12, a movable member 451 is provided with a trigger part 452 with a cam, and the trigger part 452 may push an intermediate transmitting member 454 of a push rod structure to push the detection part 999 of the electronic imaging apparatus to move. A first elastic member 455 is further provided on the intermediate transmitting member 454, one end of the first elastic member 455 is connected with a fixed end 456 fixed on the developing cartridge, and the other end is connected to the intermediate transmitting member 454.

When the trigger part 452 rotates counterclockwise as shown in the drawing, the trigger part 452 pushes the intermediate transmitting member 454 to move in a direction closing to the detection part 999, and the intermediate transmitting member 454 pushes the detection part 999 to enable the detection part 999 to move, that is, changing from a first state in the FIG. 11 to a second state in the FIG. 12. After that, the trigger part 452 continues rotating without pushing the intermediate transmitting member 454, and the elastic member 455 pushes the intermediate transmitting member 454 away from the detection part 999, since the elastic structure or the action of gravity inside the electronic imaging apparatus, the detection part 999 is moved back to the first state. The whole processes generate a pulse that the electronic imaging apparatus can recognize the developing cartridge.

Preferably, the movable member 451 of the present embodiment may imitate the detect gear 150 in FIG. 2 to provide with a structure that a rotation axis is parallel to the length direction of the developing cartridge, or may imitate the bevel gear part 354 in FIG. 9 to provide with a structure that a rotation axis is not parallel to the length direction of the developing cartridge.

Embodiment 5

The present embodiment provides another structure of an activation member.

Figure 13:
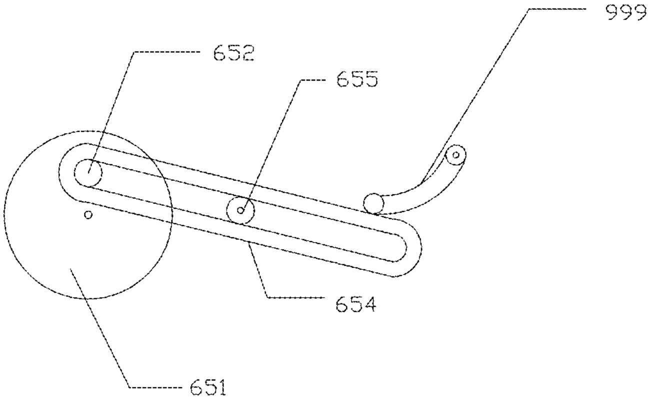
FIG. 13 and FIG. 14 are schematic structural diagrams of an activation member in Embodiment 5.
Figure 14:
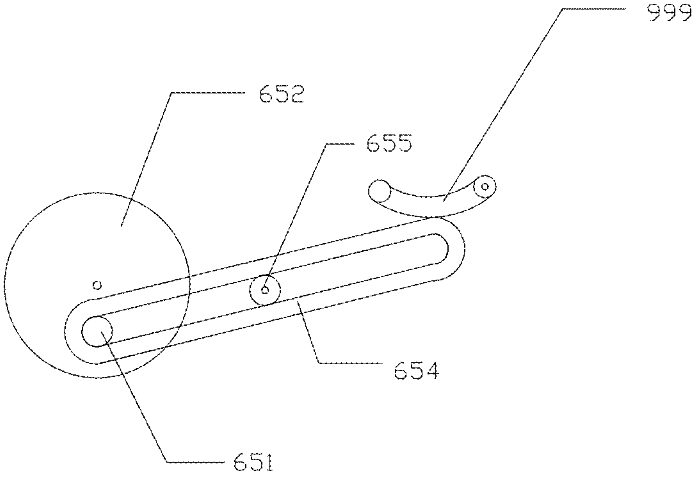

FIG. 13 and FIG. 14 are schematic structural diagrams of an activation member in the present embodiment. The activation member includes a mounting gear 651, a protrusion 652, a hollow push rod 654, and a fixed supporting point 655. The mounting gear 651 receives power from the developing cartridge and rotates, the protrusion 652 is fixed on a non-rotation axis position of the mounting gear 651, and the rotation of the mounting gear 651 changes the position of the protrusion 652. The protrusion 652 is fixedly connected with the hollow push rod 654 in a rotatable way, that is, a relative rotation, rather than a relative translation, may occur between the protrusion 652 and the hollow push rod 654. Preferably, one end of the hollow push rod 654 in the length direction is fixedly connected with the protrusion 652 in a rotatable way. The hollow push rod 654 has an "O"-shaped ring structure, and the fixed supporting point 655 is further provided inside the hollow push rod 654. The fixed supporting point 655 is fixed on the developing cartridge, and when the protrusion 652 drives the hollow push rod 654 to rotate, a relative movement occurs between the hollow push rod 654 and the fixed supporting point 655. FIG. 13 shows a first state when the detection part 999 is not lifted off from the conducting pillar by the hollow push rod 654; and FIG. 14 shows a second state when the detection part 999 is lifted off from the conducting pillar by the hollow push rod 654. When the mounting gear 651 rotates, the detection part 999 can move. By setting the features, such as different rotating speed and height of mounting gear 651, and a length of the hollow push rod 654, a predetermined pulse may be generated to enable the electronic imaging apparatus to recognize the developing cartridge.

In the present embodiment, the mounting gear 651 is the movable member, the protrusion 652 is the trigger part, and the hollow push rod 654 is the intermediate transmitting member.

Embodiment 6

The present embodiment is an improvement and deformation of the Embodiment 1.

A developing cartridge of the present embodiment adds an intermediate transmitting member on the basis of Embodiment 2, the trigger part may push the intermediate transmitting member under the driving of the movable member to enable to the intermediate transmitting member to push the detection part to move.

Figure 15:
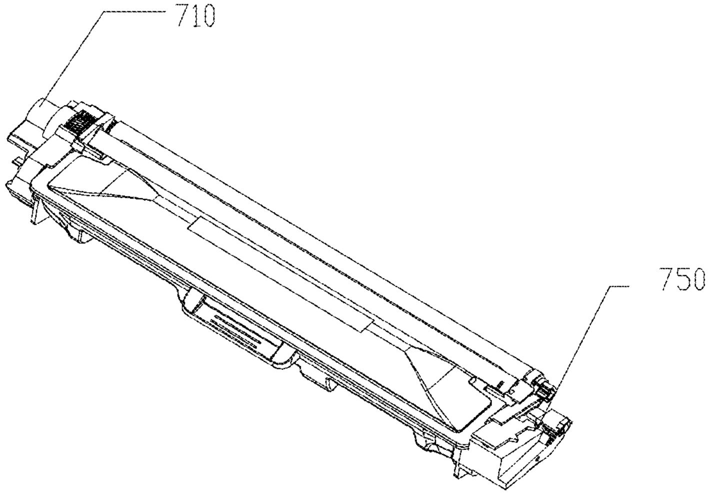
FIG. 15 is a stereoscopic view of a developing cartridge in Embodiment 6.

As shown in FIG. 15, a power reception member 710 is provided on the first side wall of the developing cartridge in the first direction, and an activation member 750 is provided on the second side wall of the developing cartridge in the first direction. The transmission relationship between the power reception member 710 and the activation member 750 is the same as that in Embodiment 2, which can be transmitted through the rotation member and the gear set.

Figure 16:
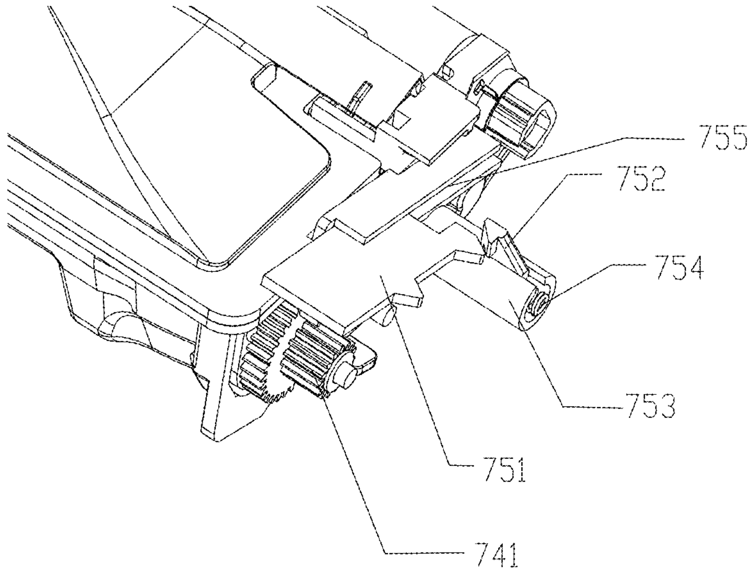
FIG. 16 is a stereoscopic view of an activation member of the developing cartridge after removing an end cover at one end in Embodiment 6.

As shown in FIG. 16, the intermediate transmitting member in the present embodiment is a push block 752, when the push block 752 moves along a straight line under the action of the push of the trigger part, the push block 752 may push the detection part to separate from the conductive part 753. The cartridge is also provided with a first elastic member 754, where one end of the first elastic member 754 is relatively fixed with the cartridge, and another end of the first elastic member 754 is relatively fixed with the push block 752, so that the push block 752 moves toward a direction away from the detection part under the elastic action of the first elastic member 754.

Figure 17:
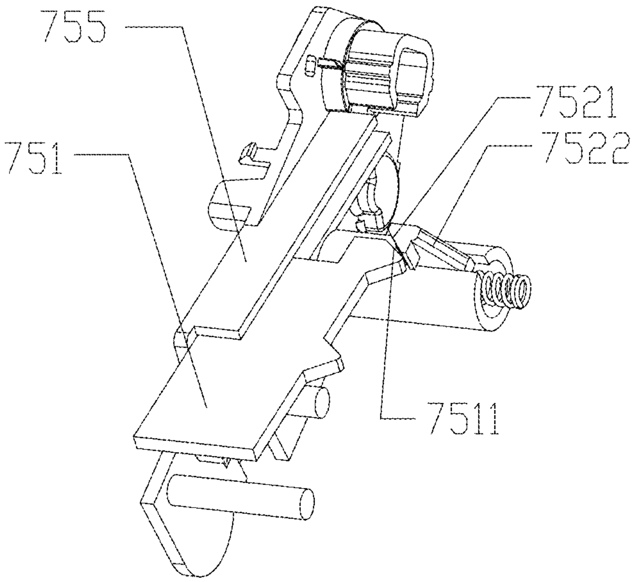
FIG. 17 to FIG. 19 are schematic diagrams of position changes of a rack in Embodiment 6.
Figure 18:
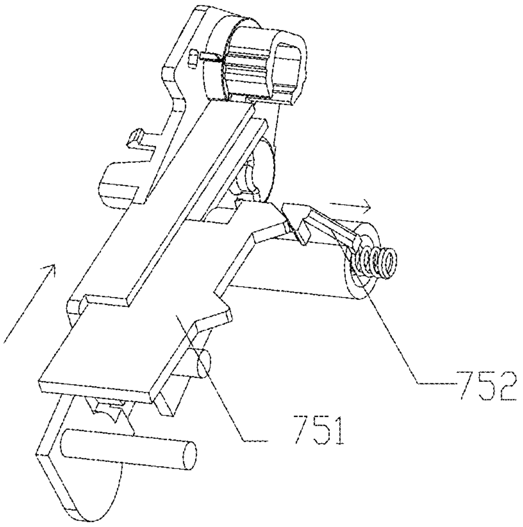
Figure 19:
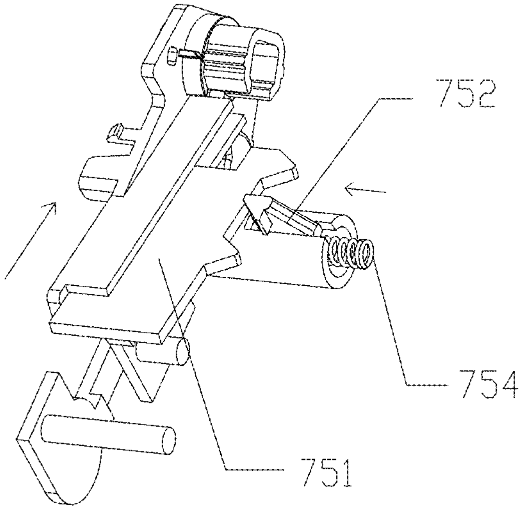

FIG. 17 to FIG. 19 are schematic diagrams of position changing relationships of a movable member in Embodiment 6. When the movable member is at an initial position, as shown in FIG. 17, one side of the movable member 751 closing to the push block 752 is provided with one or more protrusions, the protrusion is provided with a pushing inclined surface 7511, the push block 752 is provided with a pushed inclined surface 7521, the pushing inclined surface 7511 may push the push block 752 to move through the pushed inclined surface 7521. More preferably, after being pushed, the push block 752 in the present embodiment moves toward the direction away from the cartridge, so that a forced separation slope 7522 provided on the push block 752 pushes the detection part to separate from the conductive part.

As shown in FIG. 18, when the movable member 751 moves and pushes the push block 752, the forced separation slope 7522 provided on the push block 752 can push the detection part to separate from the conductive part. After that, the movable member 751 continues to move and no longer interferes with the push block 752, at this time, the first elastic member 754 pushes the push block 752 to restore the position closing to the cartridge, as shown in FIG. 19. At this time, the detection part returns back to the position contacting the conductive part, and in the process, the pulse which can be recognized by the electronic imaging apparatus is generated.

Figure 20:
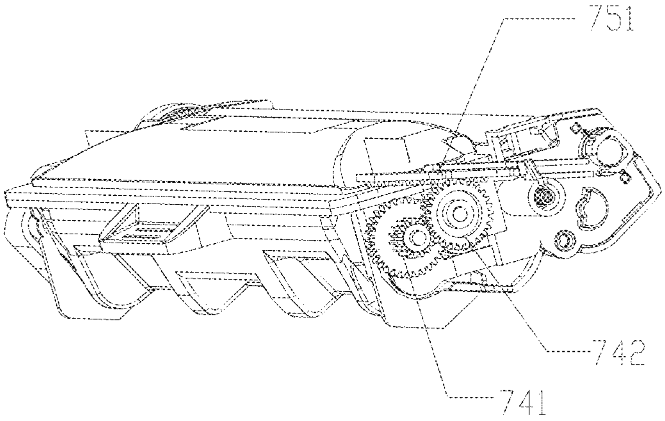
FIG. 20 is a stereoscopic view of a transmission structure in Embodiment 6.

FIG. 20 is a stereoscopic view of the transmission structure. In order to set a suitable transmission ratio, an idler 742 may further be provided between a second gear 741 and the movable member 751, so that the second gear 741 transmits the driving power to the movable member 751 by the idler 742. The number of the idler may be set according to actual requirements; on the one hand, the idler can enable less vibration during transmission is transmitted to the detection part of the electronic imaging apparatus, so as not to generate negative effects for the normal detection of the detection part, on the other hand, it enables the force of the whole gear set more reasonable.

Embodiment 7

The present embodiment is a further refinement and optimization of the solution in Embodiment 3. Unexplained structures are the same as those in Embodiment 3.

Figure 21:
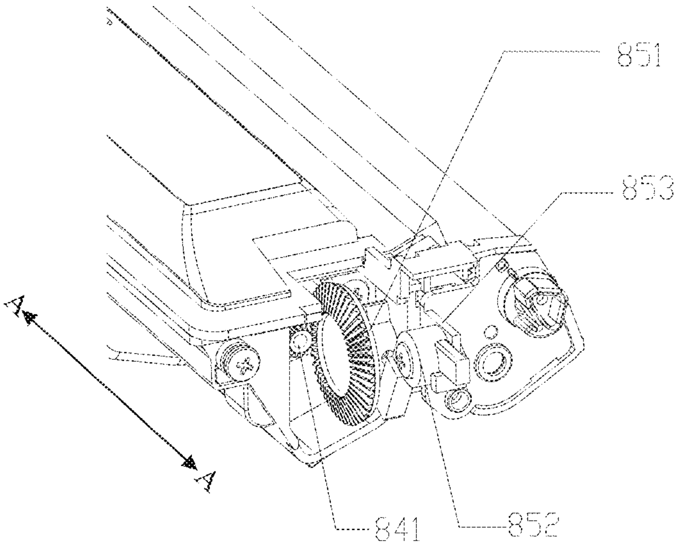
FIG. 21 is a stereoscopic view of an activation member of a developing cartridge after removing an end cover at one end in Embodiment 7.

FIG. 21 is a stereoscopic view of an activation member of a developing cartridge. A second gear 841 is a bevel gear rotatable about an axis C-C extending in the first direction, which transmits the rotational driving power to a movable member 851, a protrusion of one end of the movable member 851 toggles a swing lever 852 again, and the swing lever constitutes an intermediate transmitting member that rotates about an axis D-D.

Figure 22:
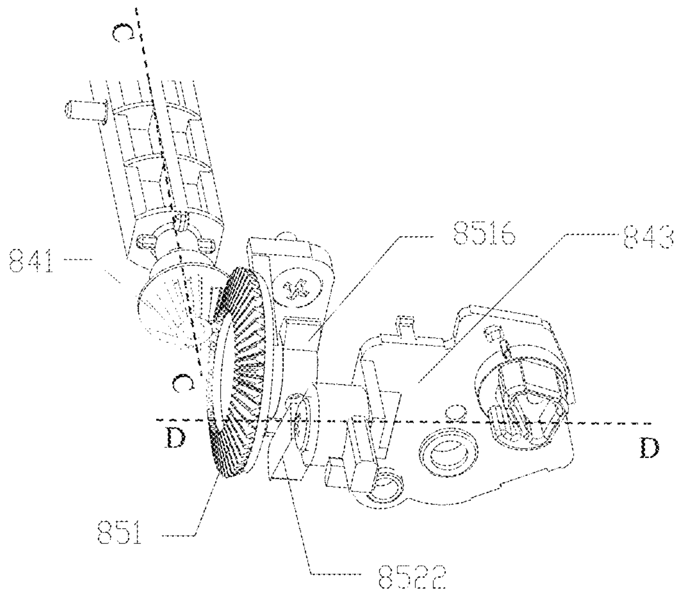
FIG. 22 is a schematic diagram of a working state of an activation member in Embodiment 7.
Figure 23:
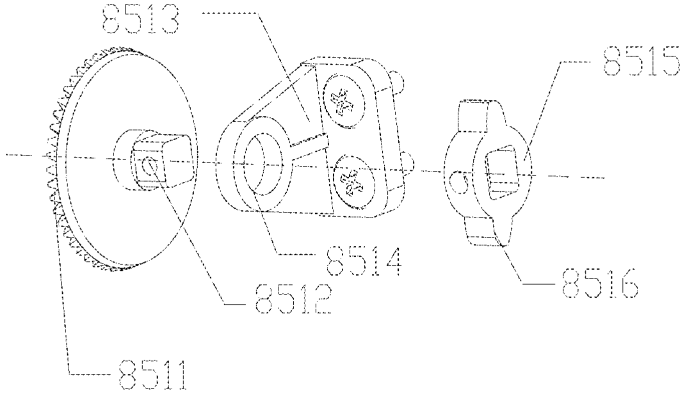
FIG. 23 is an exploded view of a movable member in Embodiment 7.

As shown in FIG. 22 and FIG. 23, the movable member 851 includes a bevel gear part 8511, a shaft 8512, a holding member 8513, a bearing 8514, a fixed part 8515 and a protrusion 8516. The bevel gear part 8511 is engaged with the second gear 841 to receive power and transmits it to the shaft 8512. The holding member 8513 is fixed on the developing cartridge, and includes the bearing 8514 for supporting the shaft 8512. Preferably, the holding member 8513 is fixed on the developing cartridge by screwing. The fixed part 8515 is fixed on the shaft 8512, so as to prevent the shaft 8512 from falling off from the bearing 8514. The fixed part 8515 is further provided with the protrusion 8516, so as to contact with the swing lever 852. When the shaft 8512 rotates, the fixed part 8515 drives the protrusion 8516 to move together.

Figure 24:
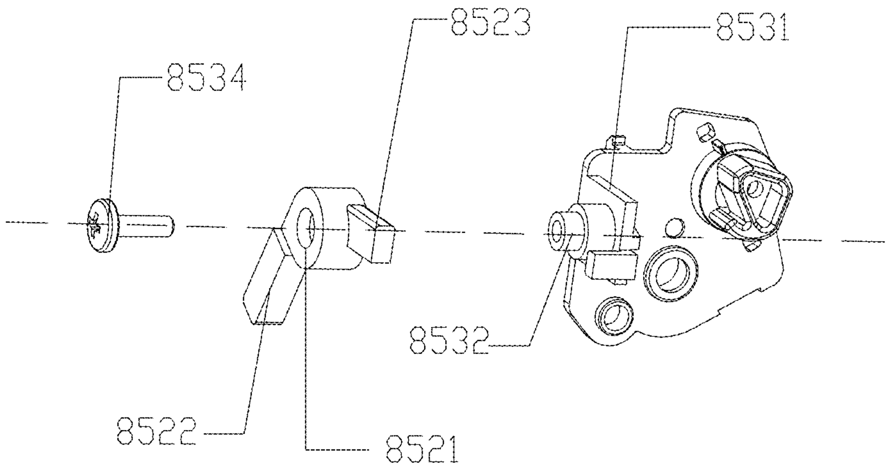
FIG. 24 is an exploded view of a swing lever and a conductive portion in Embodiment 7.

As shown in FIG. 24, a conductive part 853 includes a contacting surface 8531, for contacting with the detection part. There is also provided a protruding shaft 8532 beside it. The swing lever 852 includes a first end 8523 which is used to separate the power part from the contacting surface 8531, a ring 8521 fixed on the protruding shaft 8532, and a second end 8522 pushed by the protrusion 8516. Preferably, the ring 8521 is fixed rotatably to the conductive part 853 through a screw 8534. Preferably, the first elastic member is further provided to enable the swing lever 852, when not interfered by the protrusion 8516, to return to a position which does not affect the electronic energy transmitting by the power supply part and the contacting surface 8531. The first elastic member may set as a torsion spring whose ring structure passes through the protruding shaft 8532, one end is fixed to the conductive part and another end is fixed to the swing lever 852.

In the present embodiment, a transmission structure, for example, a transmission structure composed of at least one gear, may be provided between the second gear and the movable member, and at least one of the second gear, the transmission structure and the movable member is provided with the bevel gear structure, that is, at least one of the second gear, the transmission structure and the movable member is provided with the bevel gear part.

Embodiment 8

The thought of the present embodiment is same as that of Embodiment 2, however, the present embodiment shows another type of developing cartridge, which is matched with another type of electronic imaging apparatus. Considering a unified design concept and similar reliability tests of different types, similar solutions are also adopted. A guide rail of the present embodiment has a bending section, and a movable member 951 is a bendable flexible rack.

It should be noted that, the detection part of the electronic imaging apparatus, corresponding to the developing cartridge of the present embodiment, may be only used to detect the developing cartridge, and the electronic imaging apparatus may have a structure dedicated to supply power to the developing cartridge. The electronic imaging apparatus, corresponding to developing cartridge of the present embodiment, detects the developing cartridge through the detection part being pushed by the developing cartridge to locate at different positions.

Figure 26:
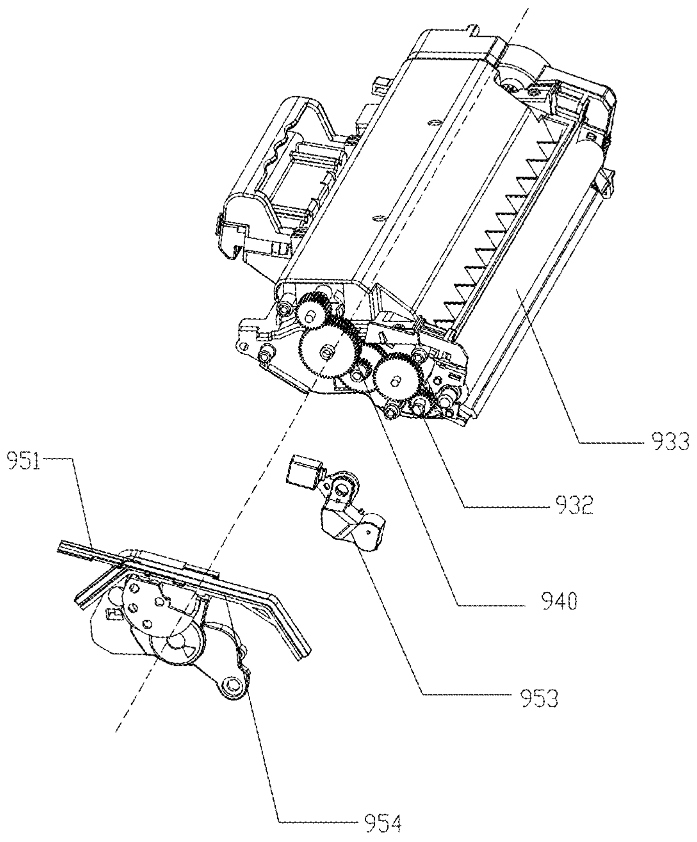
FIG. 26 is an exploded view of the developing cartridge in Embodiment 8.

As shown in FIG. 26, an electrode 953 is used to receive power from the electronic imaging apparatus, a movable member 951 is used to enable the electronic imaging apparatus to recognize the developing cartridge.

Figure 25:
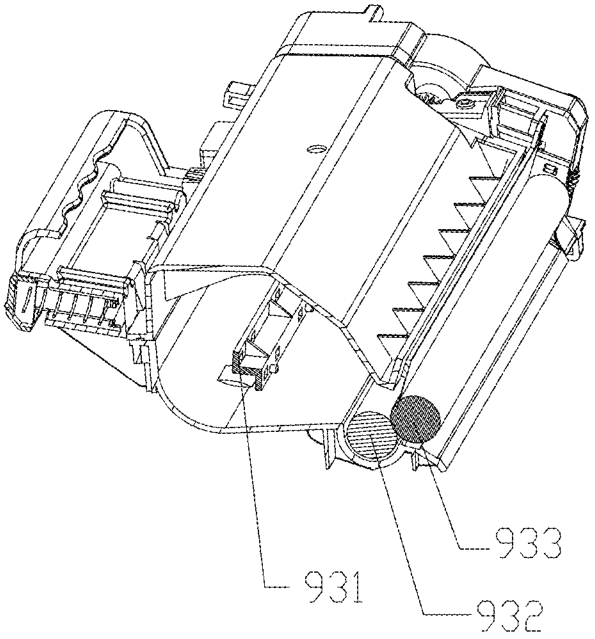
FIG. 25 is a cross-sectional view of a developing cartridge cut along a plane perpendicular to a length direction of the developing cartridge in Embodiment 8.

As shown in FIG. 25, the developing cartridge is provided with a plurality of rotation members along the first direction thereof, such as an agitator member 931, a developing supply roller 932 and a developing roller 933. All these rotation members obtain the rotational driving power from the gear set connected with the power reception member and rotate. Therefore, in the present embodiment and the above embodiments, any one of these rotation members may be selected to complete the power transmission process from one end to the other end of the developing cartridge. More preferably, the agitator member may be used as an example in above embodiments, the developing supply roller 932 is selected to as an example in the present embodiment.

As shown in FIG. 26, the gear set 940 receives the rotational driving power from the developing supply roller 932 and transmits it to drive the movable member 951. The electrode 953 is located on the side wall of the developing cartridge. The movable member 951 is installed in a guide rail 954 to prevent it from falling out, more preferably, the guide rail 954 is fixed to the developing cartridge. In order to prevent the movable member 951 from protruding too much after the developing cartridge is installed in the electronic imaging apparatus, which interferes with other structures in the electronic imaging apparatus, for example, interferes with a door cover of the electronic imaging apparatus where the developing cartridge is installed, thereby affecting normal use of the electronic imaging apparatus or causing damage of the electronic imaging apparatus, the movable member 951 in the present embodiment is set as a bendable flexible rack, for example, a rack made of nylon material, and a bending section is provided on the guide rail 954 at the same time, so that when moving along the guide rail 954 with the bending section, the flexible rack can avoid other structures in the electronic imaging apparatus, thereby preventing the movable member 951 from adversely affecting the electronic imaging apparatus. The rack also has a certain degree of hardness to receive the driving power.

Figure 27:
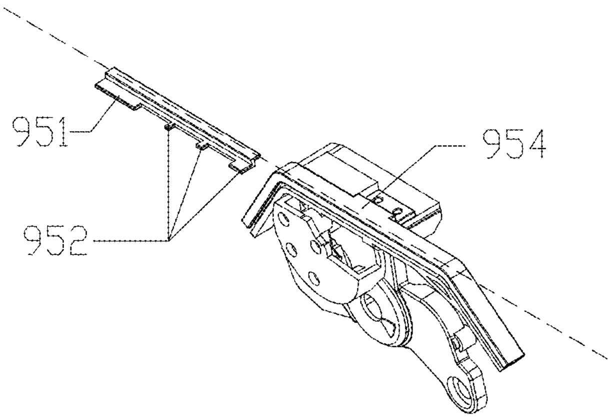
FIG. 27 is an exploded view of an activation member and a guide rail in Embodiment 8.

As shown in FIG. 27, the movable member 951 is provided with a predetermined number of protrusions 952 along a predetermined separation distance, by setting different numbers and separation distances of the protrusions 952, that is, the detection part of the electronic imaging apparatus can be pushed at different time intervals and different times to generate different signals, and the electronic imaging apparatus can learn the specific information of the developing cartridge through processing these signals. More preferably, the guide rail 954 is provided on the side wall of the cartridge, and not is parallel to the first direction of the cartridge.

Other technical features are the same as that of Embodiment 2, and can achieve the same or similar technical effects, which will not be repeated here. For details, please refer to the description of Embodiment 2.

Embodiment 9

The difference between the present embodiment and Embodiment 2 is that an intermediate transmitting member in the present embodiment is a swing lever.

Figure 28:
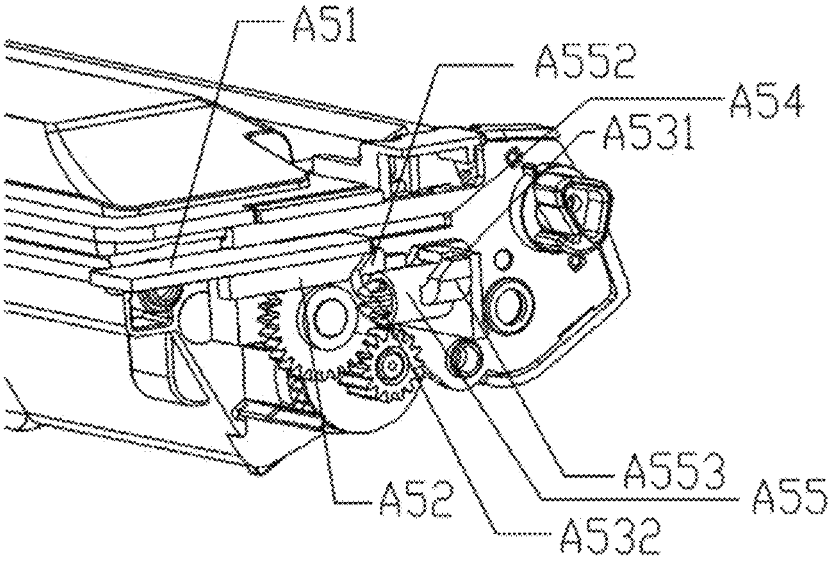
FIG. 28 is a stereoscopic view of an activation member of a developing cartridge after removing an end cover at one end in Embodiment 9.
Figure 29:
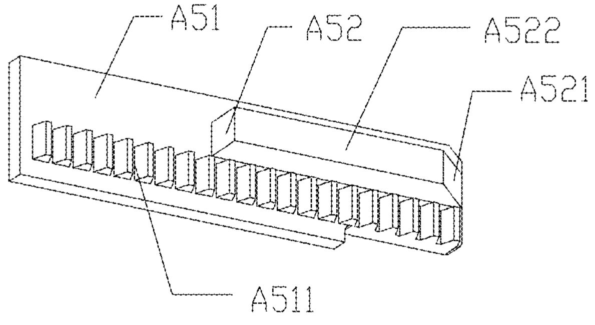
FIG. 29 is a stereoscopic view of a rack in Embodiment 9.

As shown in the FIG. 28 and FIG. 29, a connecting shaft A532 is provided on a conductive part A53, and the swing lever A55 is sleeved on the connecting shaft A532 and rotates around the connecting shaft A532; and the swing lever A55 has a first end A552 and a second end A553, where the first end A552 is used to drive the swing lever A55 to rotate under the push of the trigger part, so that the second end A553 pushes the detection part away from the conductive part A53.

The cartridge is also provided with a first elastic member (not shown in the figure), where one end of the first elastic member is relatively fixed with the swing lever A55, and the other end is relatively fixed with the cartridge. The first elastic member is used to drive the swing lever A55 to reset after the first end A552 is away from the trigger part, that is, the first elastic member has a tendency of driving the swing lever A55 to return a position where it does not block the conduction.

In implementation, after receiving power from the second gear, a rack A51 drives a protrusion A52 to move along a guide rail A54, more preferably, the guiding of the guide rail A54 is not parallel to the first direction. The conductive part A53 includes a conductive contact surface A531 and the connecting shaft A532, and the swing lever A55 is rotatably sleeved on the connecting shaft A532. The first end A552 of the swing lever may drive the swing lever A55 to rotate under the push of the protrusion A52, so that the second end A553 pushes the detection part away from the conductive contact surface A531. The arrangement of the first elastic member keeps the swing lever A55 in the position where it does not block the conduction when it is not under force, or enables the swing lever A55 to restore the position where it does not block the conduction, after the external force on the swing lever A55 disappears. More preferably, the first elastic member may be a torsion spring, whose one end is connected with the swing lever A55 and another end is connected with the cartridge, and which is coaxial with the rotation axis of the swing lever A55.

As shown in FIG. 29, the rack A51 includes a tooth part A511, the tooth part A511 is used to engaged with the gear set to push the rack A51 to move, the protrusion A52 is used to abut with the first end A552 of the swing lever A55 to push the swing lever A55, and the second end A553 of the swing lever A55 abuts with the detection part of the electronic imaging apparatus to push the detection part away from the conductive contact face A531, so that the developing cartridge is recognized by the electronic imaging apparatus. More preferably, the protrusion A52 has two parts which are a pushing inclined surface A521 and a plane A522, and the first end A552 of the swing lever has a pushed inclined surface abutting with the pushing inclined surface A521, so as to enable the contact between the protrusion A52 and the swing lever A55 more smooth. The plane A522 is used to keep the swing lever A55 in the position where the detection part is pushed away from the conductive contact surface A531 in the process that the protrusion A52 pushes the swing lever A55. Specifically, all the length of the plane A522 and the number of the protrusion A52 may be set according to the predetermined content in the electronic imaging apparatus.

Top of the connecting shaft A532 is provided with an undercut, there is no need to perform complicated screwing work during assembly. It only needs to directly install the swing lever A55 into the connecting shaft A532, and the undercut on the connecting shaft A532 can ensure that the swing lever A55 will not fall off.

It should be illustrated that the intermediate transmitting member may further provide other implementations according to actual deeds, in addition to the two implementations of the push block in Embodiment 6 and the swing lever in the present embodiment, which will not be repeated here. Other technical features are same as that of Embodiment 2, and can achieve the same or similar technical effects, which will not be repeated here. For details, please refer to the description of Embodiment 2.

Embodiment 10

Figure 30:
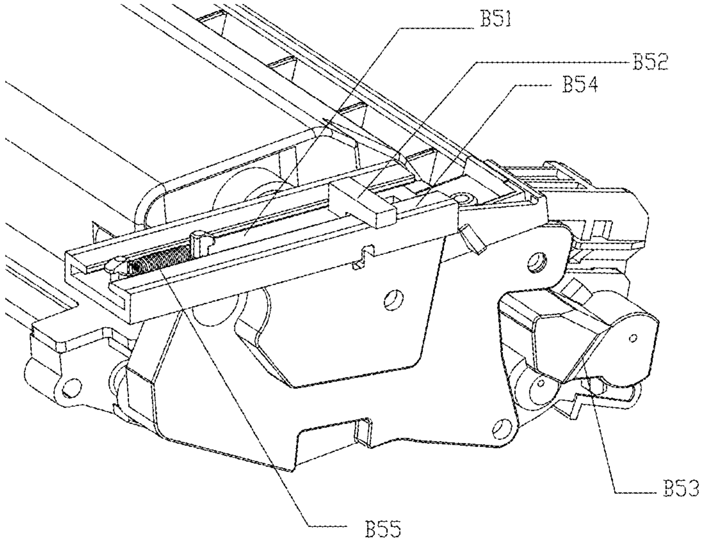
FIG. 30 is a stereoscopic structural diagram of one end of an activation member of a developing cartridge in Embodiment 10.

FIG. 30 is a stereoscopic structure of one end of an activation member of a developing cartridge in Embodiment 10. The developing cartridge of the present embodiment includes a rack B51, a protrusion B52 provided on the rack B51, a conductive part B53 and a guide rail B54 for mounting the rack B51. The guide rail B54 is provided on an end cover of the cartridge, and the end cover is fixed on the cartridge by screws or other ways to protect the internal parts. One end of the elastic member B55 connects with the rack B51, and the other end connects with the guide rail B54. The first elastic member B55 has the function of keeping the rack B51 in a first position, so as to enable the rack B51 to return back to the first position which is the position before the rack starts to detect after completing the action detected by detection part of the electronic imaging apparatus.

Figure 31:
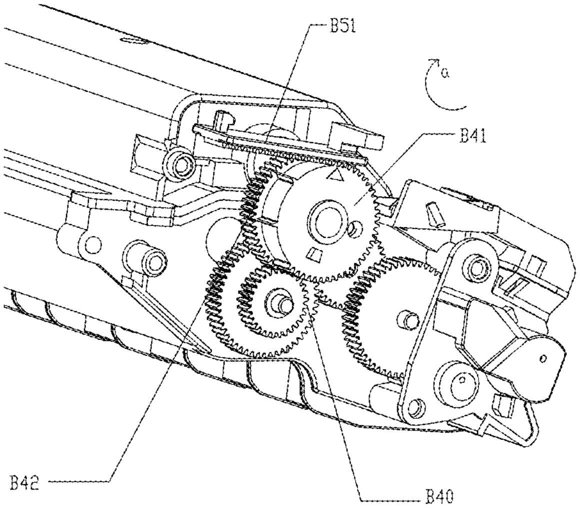
FIG. 31 is a stereoscopic structural diagram of the activation member of the developing cartridge after removing an end cover at one end in Embodiment 10.

FIG. 31 is a stereoscopic structural diagram of the activation member of the developing cartridge after removing an end cover at one end in Embodiment 10. The activation member of the present embodiment further includes a gear set, the gear set at least includes a hysteresis gear B41, the hysteresis gear B41 is used to receive the driving power transmitted by a second intermediate gear B42, the rack B51 engages with the hysteresis gear B41 to enable the rack B51 to move driven by the hysteresis gear B41, and the hysteresis gear B41 is provided with at least one first missing tooth part. The first elastic member B55 is used to drive the rack to move toward the direction away from the detection part, when the rack B51 moves to the first missing tooth part.

gear set further includes a first idle gear B40 engaged with the second intermediate gear B42, where the first idle gear B40 and the hysteresis gear B41 are coaxially provided, and the first idle gear B40 may drive the hysteresis gear B41 to rotate; and a second missing tooth part is provided on the first idle gear B40, which is used to enable the first idle gear B40 to disengage with the second intermediate gear B42.

Figure 32:
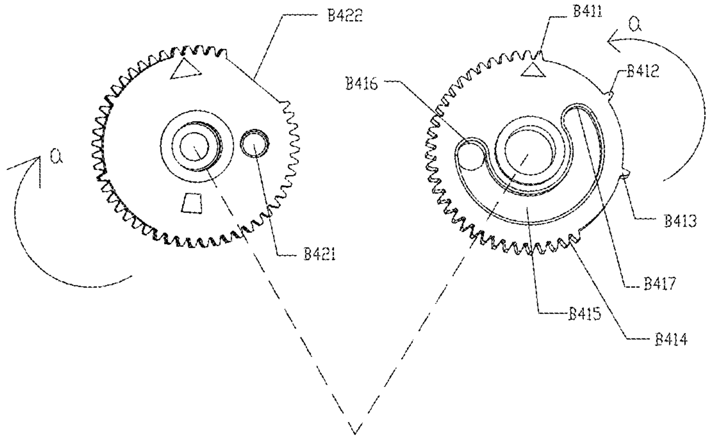
FIG. 32 is an exploded view of a relationship between a movable member and a transmission gear in Embodiment 10.

The second intermediate gear B42 transmits the power to the first idle gear B40, and the first idle gear B40 transmits the power to the hysteresis gear B41 coaxial with the first idle gear B40 through the connecting structure. The hysteresis gear B41 may engage with rack B51 through the tooth on its surface to transmit the power, and drive the rack B51 to move from a first position on the one side of detection part of electronic imaging apparatus to the direction closing to the detection part. At this time, both the first idle gear B40 and the hysteresis gear B41 move along a direction as shown in FIG. 31 and FIG. 32. The state shown in the FIG. 31 is also the state before the developing cartridge is installed in the electronic imaging apparatus for detection, that is, the state of the rack B51 is in the first position.

As shown in FIG. 32, a transmitting column B401 is provided at one side of the first idle gear B40 which is opposite to the hysteresis gear B41, and a transmitting groove B415 is provided at one side of the hysteresis gear B41 which is opposite to the first idle gear B40. The transmitting column B401 may move along the transmitting groove B415, and when moving to the predetermined position in the transmitting groove B415, the transmitting column B401 drives the hysteresis gear B41 to move, for example, the transmitting groove has a first side and a second side, when the transmitting column moves and abuts the second side of the transmitting groove, the transmitting column may drive a third gear to move.

Before the developing cartridge is detected, the transmitting column B401 is installed in the first side B416 of the transmitting groove B415, when the electronic imaging apparatus starts to transmit to the developing cartridge and drive the first idle gear B40 to rotate, the transmitting column B401 rotates from the first side B416 to the second side B417 and drives the hysteresis gear B41 to rotate. A detection of such an arrangement may be performed after the electronic imaging apparatus has been running for a short period of time, thereby preventing the data of the first collision process from not being collected by the electronic imaging apparatus when the insufficient respond of the electronic imaging apparatus is not fast enough.

The present embodiment takes the protrusion of the rack colliding the detection part three times as an example for detailed description, the hysteresis gear B41 includes a first tooth B411, a second tooth B412, a third tooth B413 and a fourth tooth B414. When the electronic imaging apparatus and developing cartridge are detected and recognized, the hysteresis gear B41 rotates in the a direction and drives the rack B51 to move. When the protrusion B52 has not reached the second position of colliding the detection part, the hysteresis gear B41 rotates to enable the first missing tooth part between the first tooth B411 and the second tooth B412 towards the rack B51, so as to enable an fourth elastic member B55 to pull the rack B51 back to the first position. The hysteresis gear B41 continues to rotate in the a direction, the second tooth B412 engages with the rack B51 and drives the rack B51 to move from the first position to the second position until it moves to the second position, so that the protrusion B52 completes the first collision with the detection part. And then the hysteresis gear B41 rotates to enables the first missing tooth part between the second tooth B412 and the third tooth B413 towards the rack B51, so as to enable the fourth elastic member B55 to pull the rack B51 back to the first position. similarly, the third tooth B413 drives the rack B51 and the protrusion B52 to complete the second collision with the detection part, the fourth elastic member B55 pulls the rack B51 back to the first position; and the fourth tooth B414 continues to drive the rack B51 and the protrusion B52 to complete the third collision with the detection part. Due to the fourth tooth has no missing tooth after rotating in a direction, the rack B51 and the protrusion B52 continue to move along the guide rail B54 after completing the third collision with the detection part, until moving to the other side of the detection apparatus. At this time, the other side of the detection apparatus where the protrusion B52 is located is a third position. In this process, the protrusion located on the rack pushes the detection part of the electronic imaging apparatus three times to enable the detection part is in different positions, therefore, it is convenient for the electronic imaging apparatus to recognize the developing cartridge.

In other embodiments, it may further set the number of the first missing tooth part according to the actual number of collisions required for detection, for example, when one collision is required, there is no need to provide the first missing tooth part, and the rack B51 may directly move from the first position to the third position. When it requires two collisions, two first missing tooth parts are provided; and when it requires four collisions, four first missing tooth parts are provided. Besides, it may further provide that the first tooth B412 directly drives the rack B51 and the protrusion B52 to the second position.

More preferably, for the sake of the hysteresis gear B41 and the first idle gear B40 no longer continue to rotate after completing the detection, refer to FIG. 31, the second missing tooth part B402 may be provided on the first idle gear B40, so that after completing the detection, the first idle gear B40 disengages with the second intermediate gear B42, so that the first idle gear B40 and the hysteresis gear B41 no longer rotate.

According the actual production needs, the present embodiment further refines the transmission structure in the gear and rack solution. All the parts that are not described in the present embodiment can be set with reference to the foregoing embodiments.

Embodiment 11

The developing cartridge of the present embodiment is further refined on the basis of Embodiment 9. All the parts that are not described in the present embodiment can be set with reference to the foregoing embodiments.

As shown in FIG. 33A, FIG. 33B and FIG. 34 to FIG. 36, the cartridge of the developing cartridge of the present embodiment further includes an end cover C70 and a holding member C60 provided on the second side wall, and the end cover C70 at least covers part of the second gear; the holding member C60 has a first guide rail C601 and a second guide rail C602, and the end cover C70 has a third guide rail C74 corresponding to the first guide rail C601 and a fourth guide rail C75 corresponding to the second guide rail C602; a rack cover C51 is provided above the rack C52, one side of the rack C52 is located in the second guide rail C602, and the other side is located in the fourth guide rail C75; and one side of the rack cover C51 is located in the first guide rail C601, and the other side is located in the third guide rail C74.

The holding member C60 has a first groove constructing the first guide rail C601 and a second groove constructing the second guide rail C602, and the end cover C70 has a third groove constructing the third guide rail C74 and a fourth groove constructing the fourth guide rail C75. The second grove or the fourth groove has a tailing edge that limits the rack C52, or both the second grove and the fourth groove have a tailing edge that limits the rack C52, and the rack C52 may be moved to abut with the tailing edge under the action of the driving power. The tailing edge can be used as a reference datum when the rack C52 is in the initial position.

The rack C52 moves along the second guide rail C602 and the fourth guide rail C75 under the action of the driving power. The rack cover C51 may move along the first guide rail C601 and the third guide rail C74, so that the rack cover C51 is installed in place.

The rack cover C51 is detachable installed at the cartridge, to enable the rack C52, after the rack cover C51 is removed from the cartridge, to be removed from the second guide rail C602 and the fourth guide rail C75 and reinstalled to the initial position.

Specifically, the power reception member and the second gear of the present embodiment are still respectively provided on the first side wall and the second side wall of the cartridge, in the present embodiment, more preferably, the rotation member transmitted power from one end of the power reception member to one end of the second gear is the agitator member.

Figure 33A:
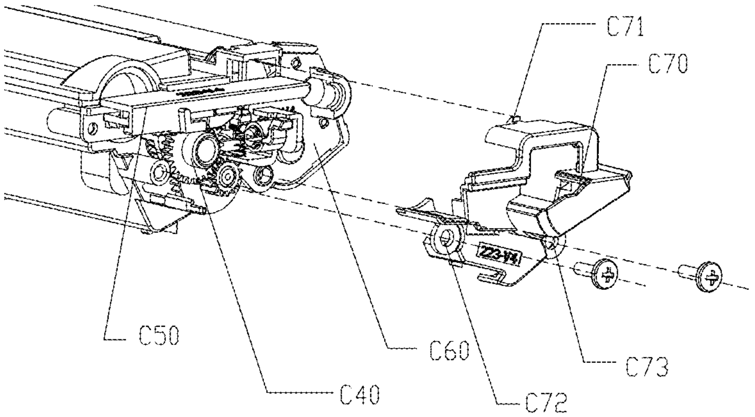
FIG. 33A is an exploded view of an installation of an end cover in Embodiment 11.
Figure 33B:
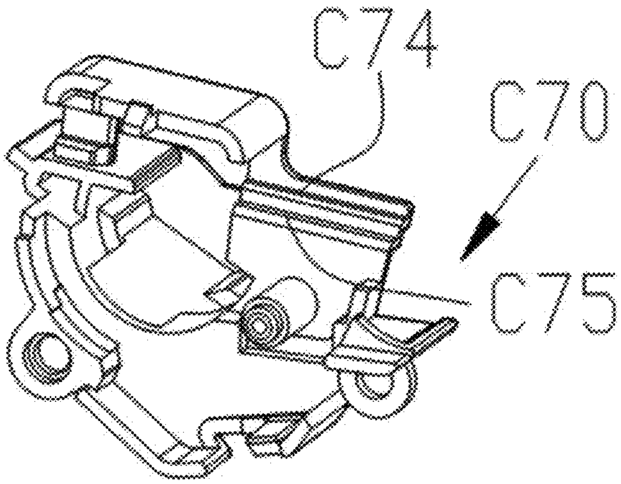
FIG. 33B is a schematic structural diagram of an end cover in Embodiment 11.

As shown in FIG. 33A and FIG. 33B, the end cover C70 is used to protect various parts provided on the second side wall of the cartridge, such as the gear set C40, the activation member C50 and the holding member C60. The end cover C70 is relatively fixed with the second side wall of the cartridge after the developing cartridge is installed.

The end cover C70 is provided with an undercut C71, a first screw hole C72, a second screw hole C73, a third guide rail C74 and a fourth guide rail C75. The undercut C71 is hooked through a predetermined corresponding position on the cartridge, and the first screw hole C72 and the second screw hole C73 are connected with the predetermined screw hole on the cartridge by screwing, so as to enable the end cover C70 to fixedly connect to the cartridge. The third guide rail C74 is used to support the rack cover C51, and the fourth guide rail C75 is used to support the rack C52.

Figure 34:
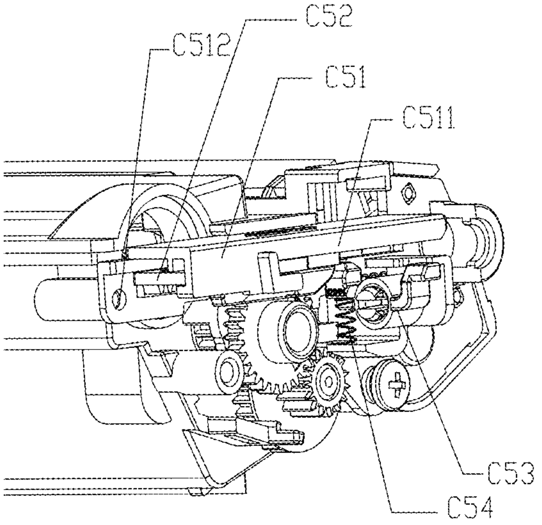
FIG. 34 is a schematic diagram of a structure of a guide rail after removing an end cover in Embodiment 11.
Figure 35:
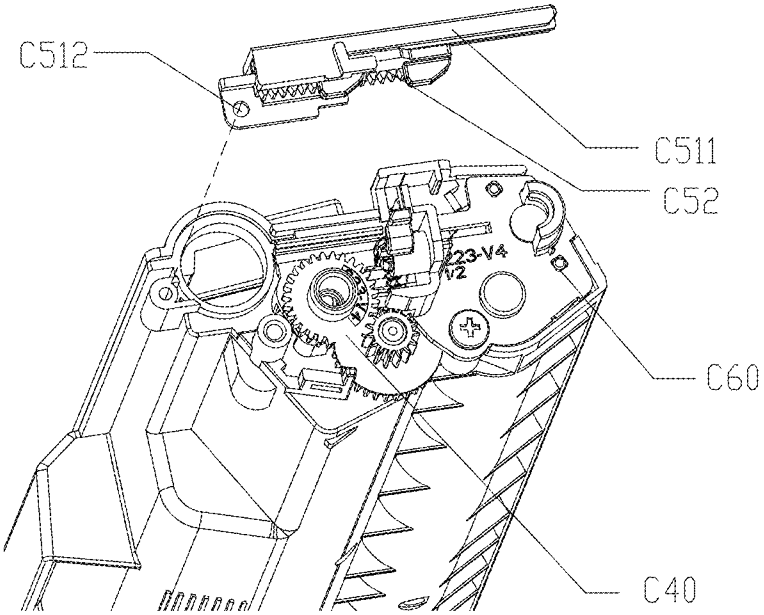
FIG. 35 is an exploded view of installation locations of the guide rail and an activation member in Embodiment 11.

As shown in FIG. 34 and FIG. 35, the rack cover C51 is fixed on the second side wall of cartridge by the third screw hole C512, and the rack cover C51 is provided with a rail inside to accommodate the rack C52 which moves along a corresponding rail. A swing lever C53 may be toggled by the protrusion on the rack C52. An elastic member C54 maintains the swing lever C53 at the first position of the swing lever C53. There is a side surface C511 on the rack cover C51, and after the rack cover C70 is assembled, the side surface C511 may contact with the end cover C70, so as to further restrict the movement of the rack cover C51. After the rack cover C51 is restricted by the end cover C70, even if the screw in the third screw hole C512 is removed, the rack cover C51 may only be installed or taken out along a specific location perpendicular to the first direction. In this way, when the rack C52 requires to be reset after completing a printing detection, only the rack cover C51 needs to be taken out along the specific position to change the position of the rack C52 to complete the reset. Further, it may also install the screw in the third screw hole C512 in place after the printing detection is completed and the rack C52 is reset, in the previous production process, only an abutment between the end cover C70 and the side surface C511 can be used to limit and restrict the rack cover C51.

Figure 36:
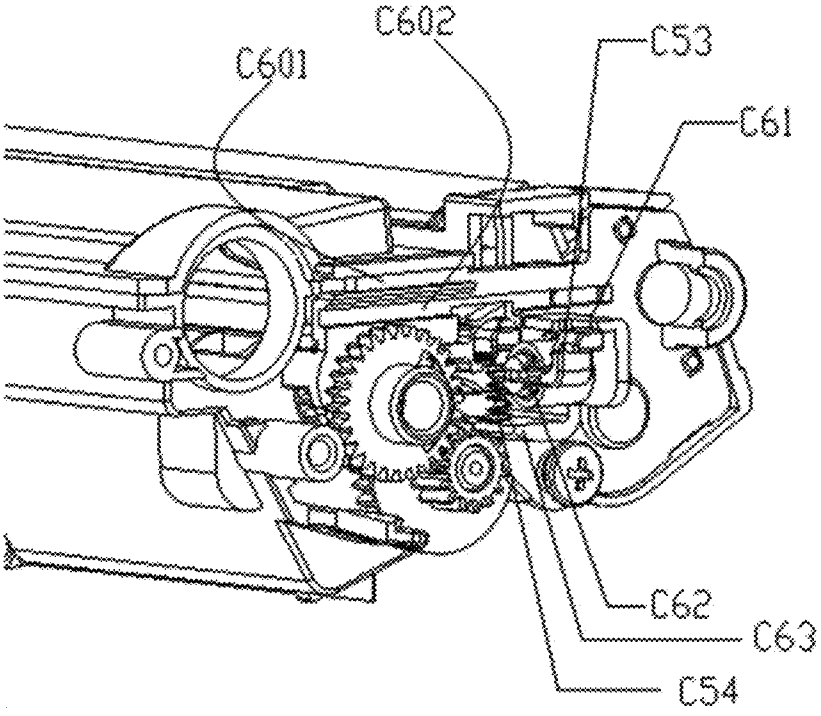
FIG. 36 is a schematic structural diagram of a developing cartridge after removing the guide rail, the rack and the end cover in Embodiment 11.
Figure 37:
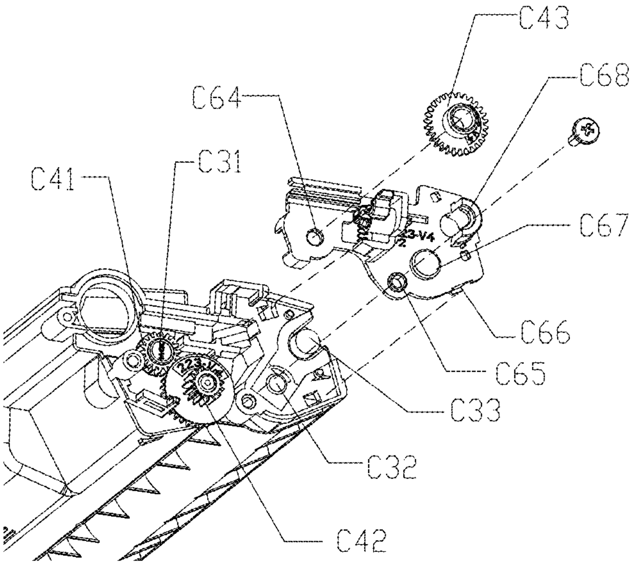
FIG. 37 is an exploded view of an assembly of parts of the developing cartridge after removing the guide rail, the rack and the end cover in Embodiment 11.

As shown in FIG. 36 and FIG. 37, the gear set C40 includes a fourth gear C41, a second gear C42 and a third gear C43. The second gear C42 is connected and rotates coaxially with the agitator member C31. The fourth gear C41 is a two-stage gear, one layer of which engages with the second gear C42, and the other layer of which engages with the third gear C43. The third gear C43 is used to engage with the rack C52, so that the third gear C43 transmits the power received from the fourth gear C41 to the rack C52, and drive the rack C52 to move. The second gear C42 is closer to the main of the developing cartridge than the holding member C60. The third gear C43 is farther away from the main of the developing cartridge than the holding member C60. The third gear C43 is rotatable supported by the holding member C60, that is, the shaft of the third gear C43 may reach into a shaft sleeve hole C64 of the holding member C60 to obtain a rotatable support. The holding member C60 has a first guide rail C601 used to support the rack cover C51 and a second guide rail C602 used to support the rack C52.

The holding member C60 has an undercut C66 fixedly connected with the cartridge and a fourth screw hole C65. More preferably, during the assembly process of the developing cartridge, the fourth screw hole C65 coincides with the second screw hole C73 on the end cover C70 (as shown in FIG. 28), and a screw that passes through the fourth screw hole C65 and the second screw C73 may be used to fix the holding member and the end cover on the cartridge to save space and material. The holding member C60 is provided with a developing supply roller conductive part C67 and a developing roller conductive part C68 which respectively transmit electrical energy to the developing supply roller C32 and the developing roller C33. In the present embodiment, the conductive part is provided on the holding member C60, the conductive part includes a conductive contact surface C61 connected with the electronic imaging apparatus to receive the electrical energy, and a connecting shaft C62 provided closing to the conductive contact surface C61. More preferably, a centerline of the connecting shaft C62 is parallel to the conductive contact surface C61, and a free end of the connecting shaft C62 is provided with a detachment prevention structure. The swing lever C53 is sleeved on the connecting shaft C62. The holding member C60 is further provided with a support surface C63 supporting the first elastic member C54.

Figure 38:
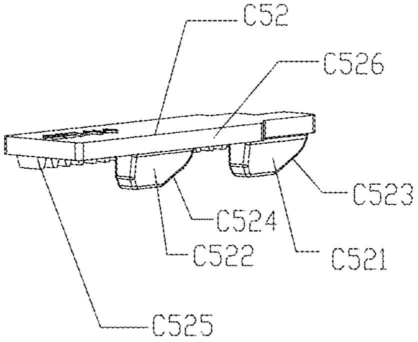
FIG. 38 and FIG. 39 are stereoscopic views of the rack with different viewing angles in Embodiment 11.
Figure 39:
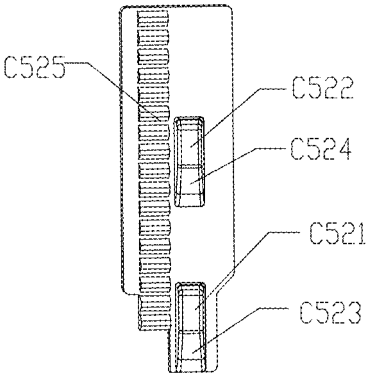

As shown in FIG. 38 and FIG. 39, a convex tooth part C525 is provided on the rack C52, and used to engage with the third gear C43 and receive the power, and the rack C52 is further provided with a protrusion connected with the swing lever C53. In the present embodiment, the number of the protrusion is two, that is, a first protrusion C521 and a second protrusion C522. Further, in order to enable the process of the protrusion contacting with the swing lever C53 smoother, the first protrusion C521 is provided with a pushing inclined surface C523, and the second protrusion C523 is provided with a pushing inclined surface C524.

As shown in FIG. 40 to FIG. 44, the swing lever C53 has a first end C532, a second end C533 and a ring C531. In the present embodiment, another setting method of the first elastic member is provided, that is, one end of the first elastic member C54 connects with the first end C532 of the swing lever, and the other end of the first elastic member C54 connects with the support surface C63, so that the swing lever C53 keeps in the first position without external force, and after the swing lever C53 moves to the second position, it has a tendency of pushing the swing lever C53 back to the first position.

When assembling the developing cartridge, one side of the rack C52 is located in the second guide rail C602, and the other side is located in the fourth guide rail C75, and it may move along the second guide rail C602 and the fourth guide rail C75 to install in place; and one side of the rack cover C51 is located in the first guide rail C601 and the other side is located in the third guide rail C74, and it may move along the first guide rail C601 and the third guide rail C74 to install in place.

Figure 40:
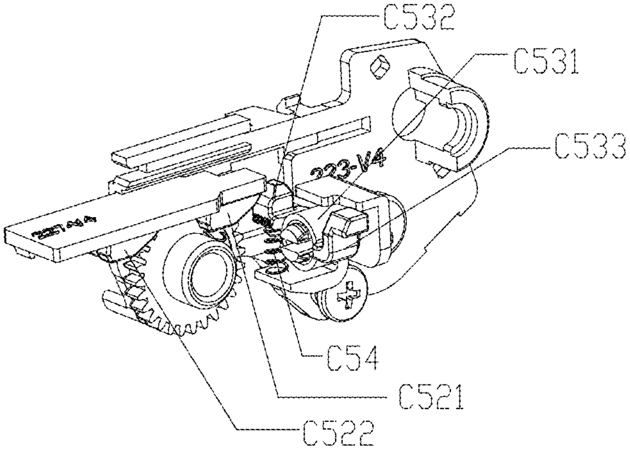
FIG. 40 to FIG. 44 are schematic diagrams of a movement process between the rack and the swing lever during a detection process of the electronic imaging apparatus in Embodiment 11.

As shown in FIG. 40, when the electronic imaging apparatus does not start to drive the developing cartridge, the rack C52 is not in contact with the first end C532, at this time, the rack C52 is at the initial position, the swing lever C53 is at the first position, and the second end C533 does not prevent the electronic imaging apparatus from transmitting electrical energy to the developing cartridge.

Figure 41:
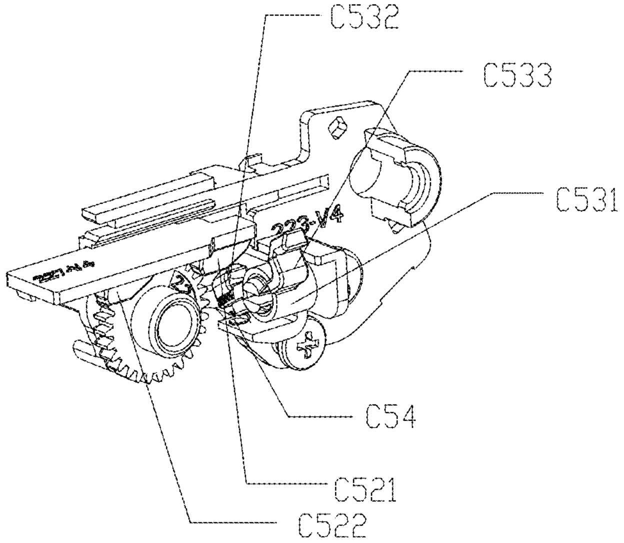

As shown in FIG. 41, after the electronic imaging apparatus drives the developing cartridge by the power reception member and transmits driving power to the rack C52, the rack C52 receives the driving power and moves along the second guide rail C602 and the fourth guide rail C75. The first protrusion C521 is in contact with the first end C532, and the second end C533 prevents the electronic imaging apparatus from transmitting electrical energy to the developing cartridge, at this time, the swing lever C53 is at the second position.

Figure 42:
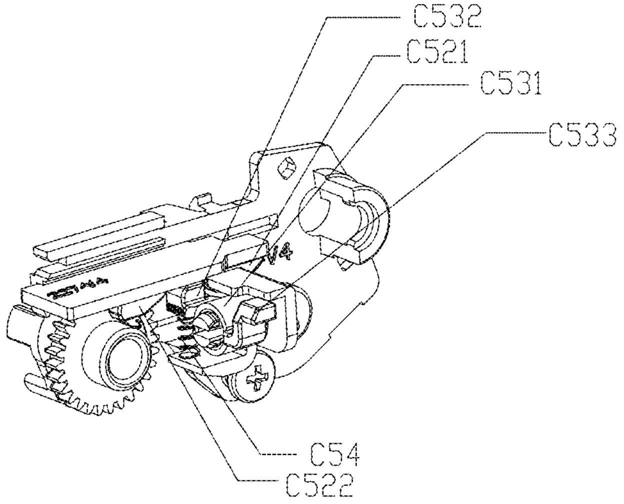

As shown in FIG. 42, the rack C52 continues to move forward, when the first protrusion C521 is no longer in contact with the first end C532, the first elastic member C54 pushes the swing lever C53 from the second position back to the first position, at this time, the second end C533 does not prevent the electronic imaging apparatus from transmitting electrical energy to the developing cartridge.

Figure 43:
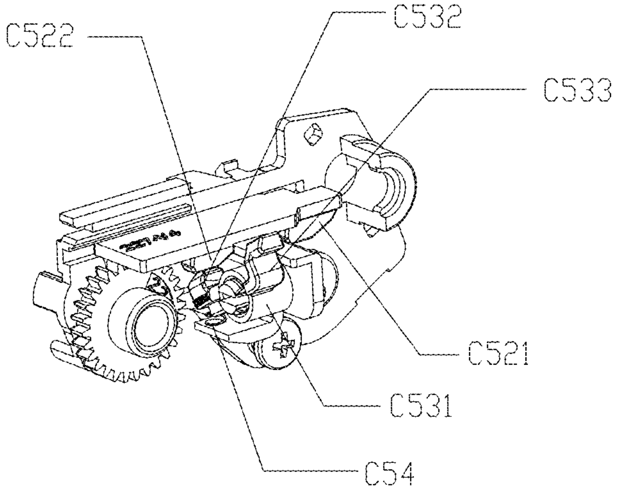

As shown in FIG. 43, the rack C52 then continues to move forward until the second protrusion C522 is in contact with the first end C532, and the second end C533 prevents the electronic imaging apparatus from transmitting electrical energy to the developing cartridge, at this time, the swing lever C53 is at the second position.

Figure 44:
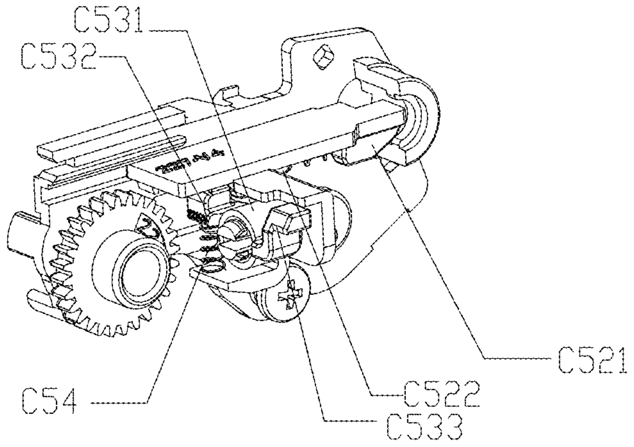

As shown in FIG. 44, when the rack continues to drive forward and the second protrusion C522 is no longer in contact with the first end C532, at this time, the rack C52 is at a last position, and the first elastic member C54 pushes the swing lever C53 from the second position back to the first position, at this time, the second end C533 does not prevent the electronic imaging apparatus from transmitting electrical energy to the developing cartridge. In the whole movement process of the rack, the electronic imaging apparatus is pushed twice by the swing lever and receives pulse information twice, so that the specific developing cartridge can be recognized.

After the rack C52 moves from the initial position to the last position, firstly, the rack cover C51 is removed from the developing cartridge; then, the rack C52 is removed from the second guide rail and the fourth guide rail, and reinstalled at the initial position; finally, the rack cover C51 is installed back to the developing cartridge, thereby completing the reset of the rack C52.

Other technical features are same as those of Embodiment 2, and can achieve the same or similar technical effects, which will not be repeated here. For details, please refer to the description of Embodiment 2.

Embodiment 12

The present embodiment is similar to that in Embodiment 11, and parts not described are regarded as the same as those of Embodiment 11.

A rack cover D51 is clamped with the cartridge; and/or, the rack cover C51 is threaded with the cartridge.

A cantilevered buckle (not shown in figure) is provided at a second guide rail D602 and/or a fourth guide rail, the rack C52 is provided with a card slot (not shown in figure) matching with the buckle, when the card slot abuts the buckle, the rack D52 is at the initial position; and the buckle can used to be a reference datum when the rack D52 is at the initial position.

Figure 45A:
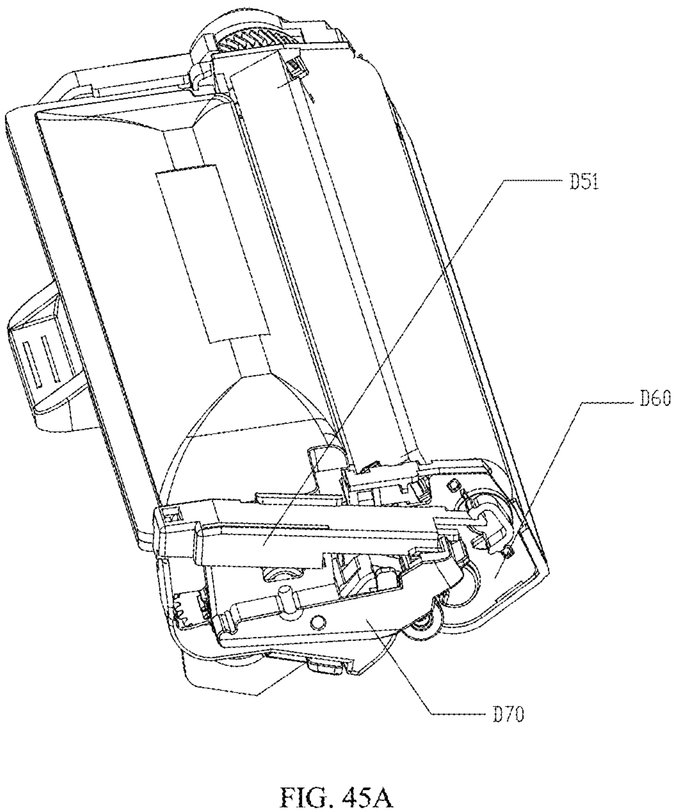
FIG. 45A and FIG. 45B are stereoscopic views of a developing cartridge in Embodiment 12.
Figure 45B:
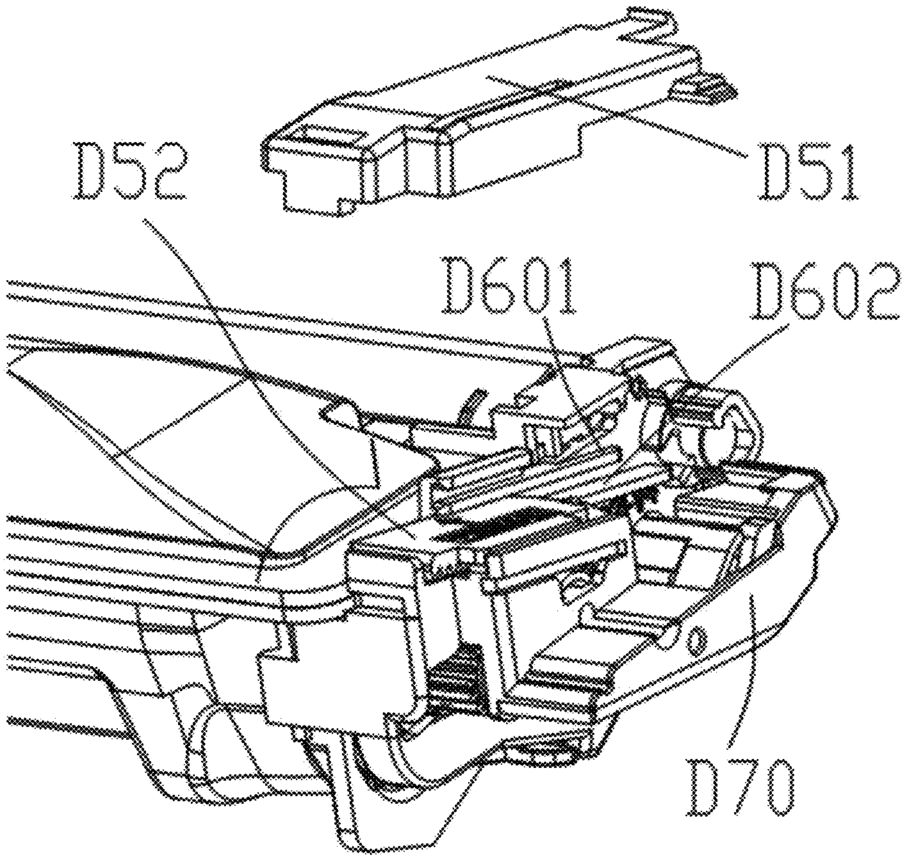

As shown in FIG. 45A and FIG. 45B, the developing cartridge includes a rack cover D51, an end cover D70, a holding member D60 and other components. Among them, the rack cover D51 may be removed from the developing cartridge without removing other parts. More preferably, the rack cover D51 may be connected to the cartridge by the buckle, and may be removed from the cartridge by hand along the predetermined direction, or, the rack cover D51 may be fixed on the cartridge by screws.

Figure 46:
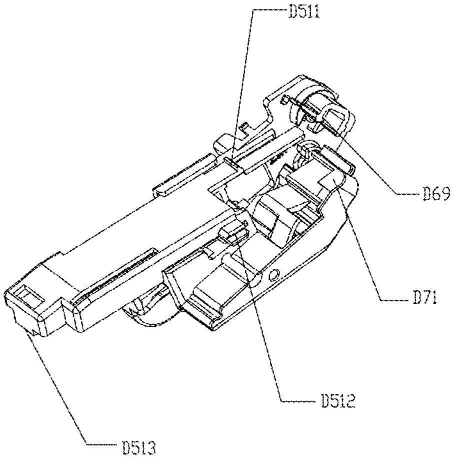
FIG. 46 to FIG. 49 are schematic structural diagrams with different positions and different viewing angles during movement of a guide rail protecting cover in Embodiment 12.
Figure 47:
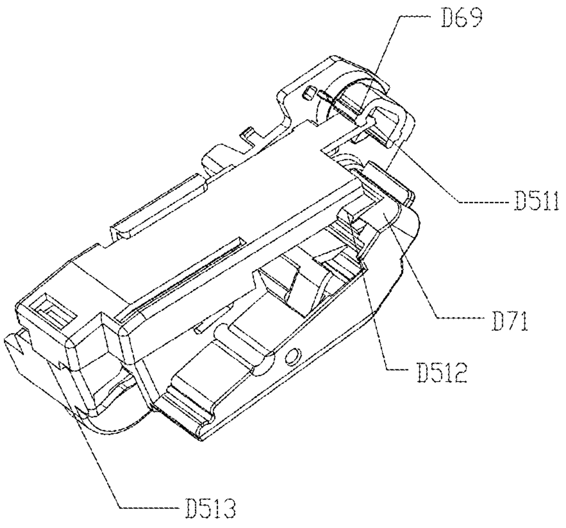
Figure 48:
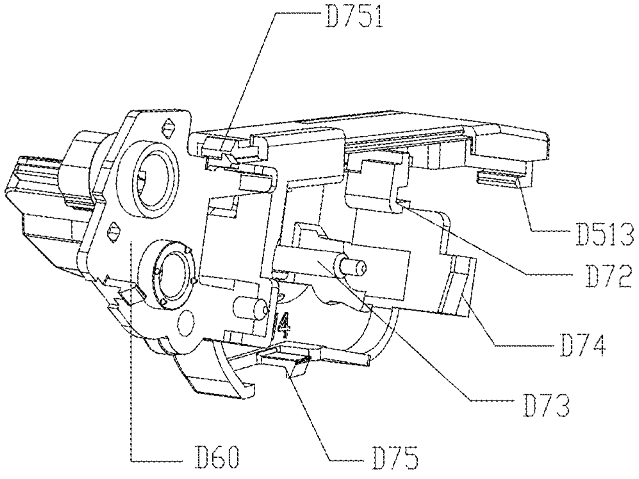
Figure 49:
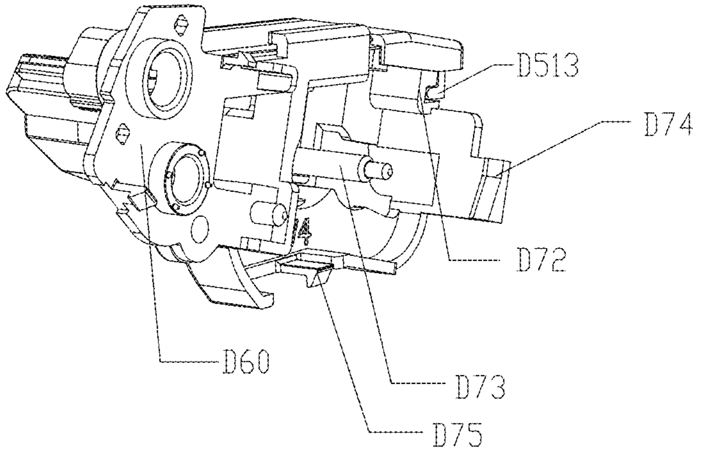

FIG. 46 and FIG. 48 are a position before the rack D51 is installed in place, and FIG. 47 and FIG. 49 are a position after the rack D51 is installed in place; and FIG. 46 and FIG. 47 are schematic structural diagrams viewed from the direction outside of the developing cartridge, FIG. 48 and FIG. 49 are schematic structural diagrams viewed from the direction inside the developing cartridge, and viewed angles of the direction outside and the direction inside are roughly opposite (that is, an angle between the two is about 180 degrees).

As shown in FIG. 46 to FIG. 49, the rack cover D51 has a first fixed point D511, a second fixed point D512 and a third fixed point D513. Among them, the first fixed point D511 is located in front of a movement direction of the rack cover D51 during the installation process, and the first fixed point D511 is clamped in the specific fixed position D69 on the holding member D60 by a card convex way. The second fixed point D512 is used to prevent the rack cover D51 from falling off along the installation direction perpendicular to the rack cover D51, and the second fixed point D512 reaches into a first depression D71 provided at the end cover during the movement process of the rack cover D51 along the installation direction, so as to prevent the rack cover D51 from falling off. The third fixed point D513 is located behind the movement direction of the rack cover D51 during the installation process. More preferably, the third fixed point D513 is a card convex provided at the rack cover D51, and the card convex may reach into a second depression D72 of the end cover D70, so that the rack cover D51 may only be taken out along a specific direction.

Figure 50:
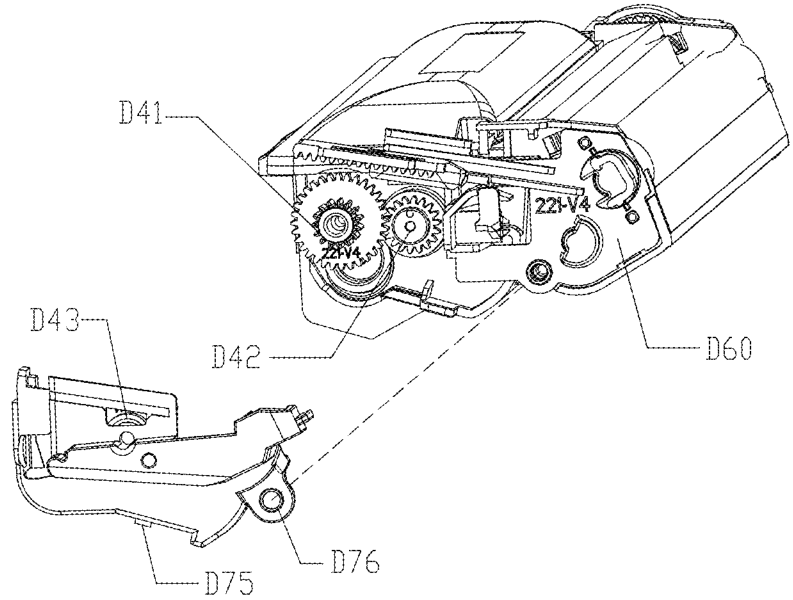
FIG. 50 and FIG. 51 are exploded views with different viewing angles during a process of the end cover being installing to the developing cartridge in Embodiment 12.
Figure 51:
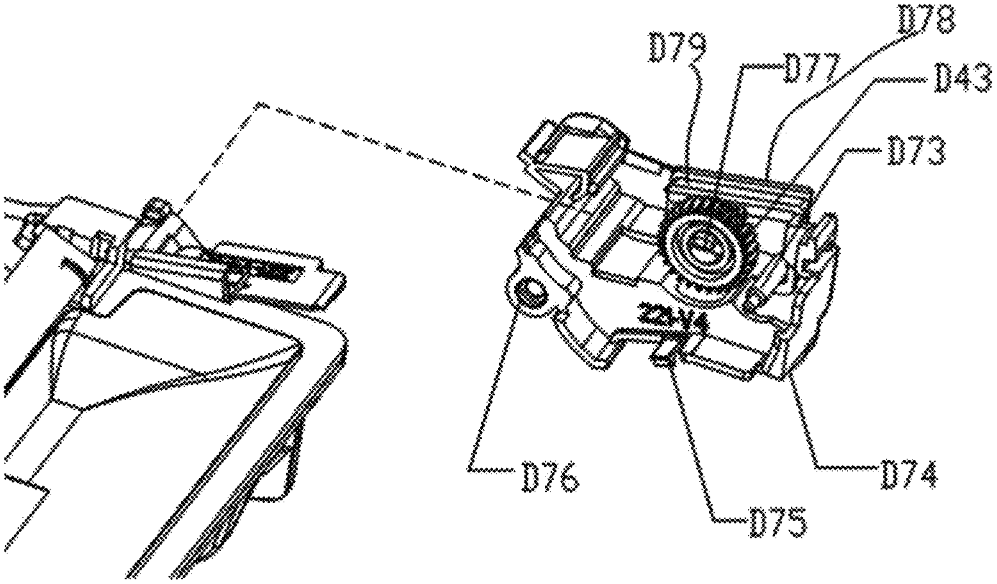

As shown in FIG. 50 and FIG. 51, the end cover D70 is provided with a first buckle D74, a second buckle D75 and a screw hole D76 for fixing the end cover D70 on the cartridge; and the end cover D70 is further provided with a third guide rail D78 used to support the rack cover D51, and a fourth guide rail D79 used to support the rack D52. The developing cartridge includes a gear set with a similar structure and transmission relationship to that of Embodiment 10, however, in the present embodiment, the holding member D60 no longer divides the gear set in two different areas, a third gear D43 is rotatablely fixed on the end cover D70. Through providing a third gear shaft D77 on the end cover D70, and providing an anti-falling undercut at the top of the third gear shaft D77, the third gear D43 may be rotatably fixed on the end cover D70. To enable the assembly process much easier, a second gear half-shaft D73 may further be provided on the end cover D70, the second gear half-shaft D73 is docked with another second gear half-shaft on the cartridge to form as a completed second gear shaft. During assembly, it may first insert the second gear D42 into the second gear half-shaft D73, through reasonably setting the position of the second gear half-shaft and the position of the first buckle D74, the protruding part of a free end of the first buckle D74 can restrain the second gear D42, so that the second gear D42 does not fall off from the end cover D70 without the action of external force. Therefore, the second gear D42 may be installed at the cartridge together with the end cover D70 during assembly, thereby inducing work hours of workers and risk of possible loss gears.

Figure 52:
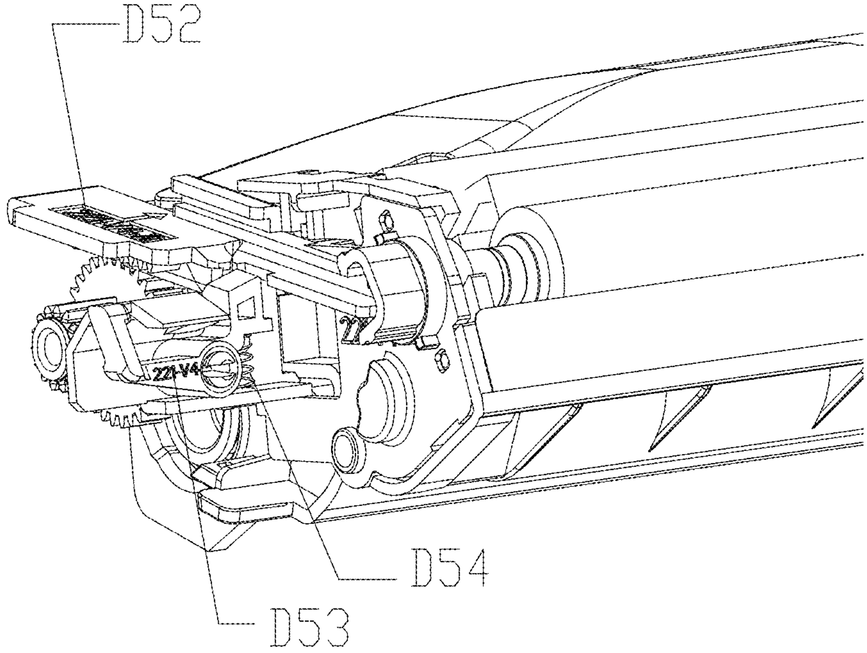
FIG. 52 is a schematic structural diagram of a swing lever part in Embodiment 12.

As shown in FIG. 52, in the present embodiment, the positions of the swing lever D53 and the first elastic member D54 are adaptively designed according to the specific structure and the space position of the developing cartridge, principles of the swing lever in two embodiments are the same and may all be pushed by the rack, which are two specific implementation of the swing lever.

Figure 53:
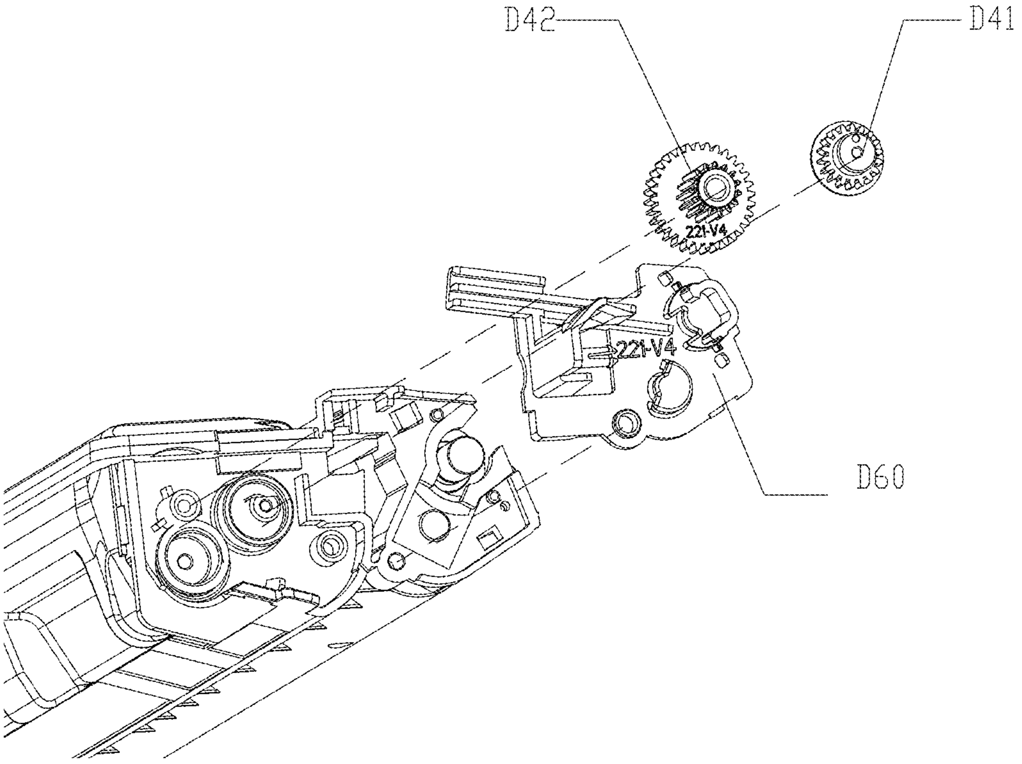
FIG. 53 and FIG. 54 are exploded views with different angles of installation of a conductive portion in Embodiment 12.
Figure 54:
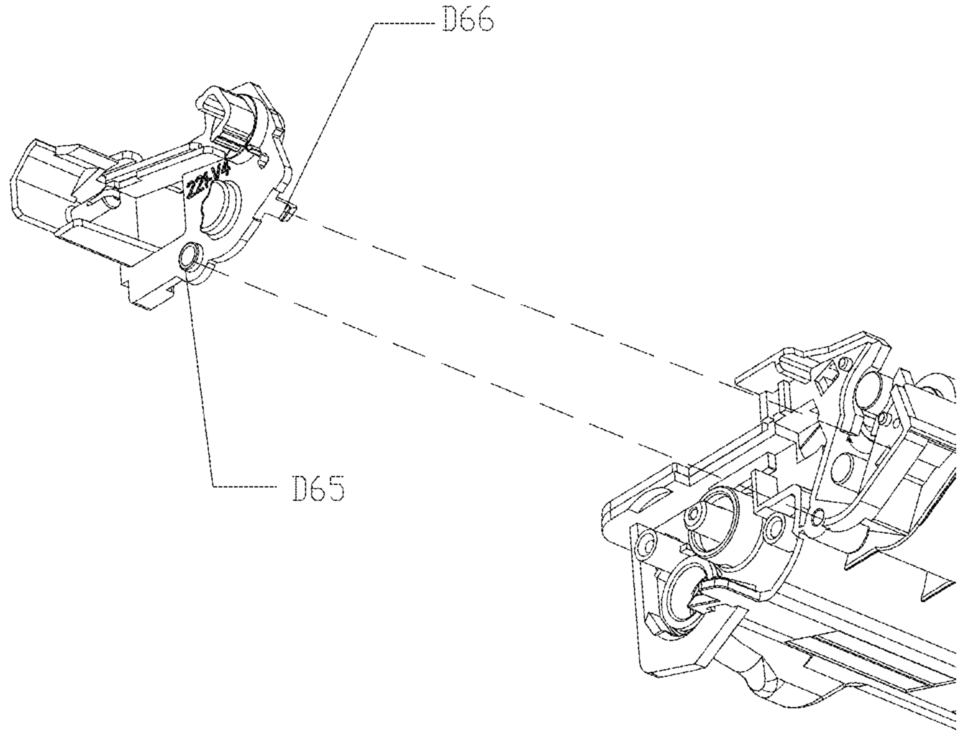

As shown in FIG. 53 and FIG. 54, the holding member D60 is fixed on the cartridge by a third buckle D66 and a screw hole D65, and the projection of the holding member D60 on a plane perpendicular to the first direction of the cartridge does not coincide with the gear set D40, especially, does not coincide with the fourth gear D41 and the second gear D42.

The motion rail of the rack D52 may be set as: one side is achieved by the holding member D60 and the other side is achieved by the end cover D70. One side of the rack is located in a second guide rail D602 of the holding member D60, and the other side is located in a fourth guide rail D79 of the end cover D70. One side of the rack cover D51 is located in a first guide rail D601 of the holding member D60, and the other side is located in a third guide rail D78 of the end cover D70, after the rack cover D51 is installed at the developing cartridge, a guide rail structure which is complete and may restrain simultaneously the upper and lower portions of the rack D52 is formed on one side of the end cover D70. A cantilevered buckle (not shown in figure) may be provided on the second guide rail D602 or the fourth guide rail D79, at the same time, a card slot (not shown in figure) that can abut with the buckle is provided on the rack D52, so as to restrain the rack D52 at the initial position, and the buckle may be a reference datum when the rack D52 is at the initial position.

Other technical features are same as those of Embodiment 11, and can achieve the same or similar technical effects, which will not be repeated here. For details, please refer to the description of Embodiment 2.

Embodiment 13

The present embodiment discloses a gear set structure at one end of an activation member of a developing cartridge.

Figure 55:
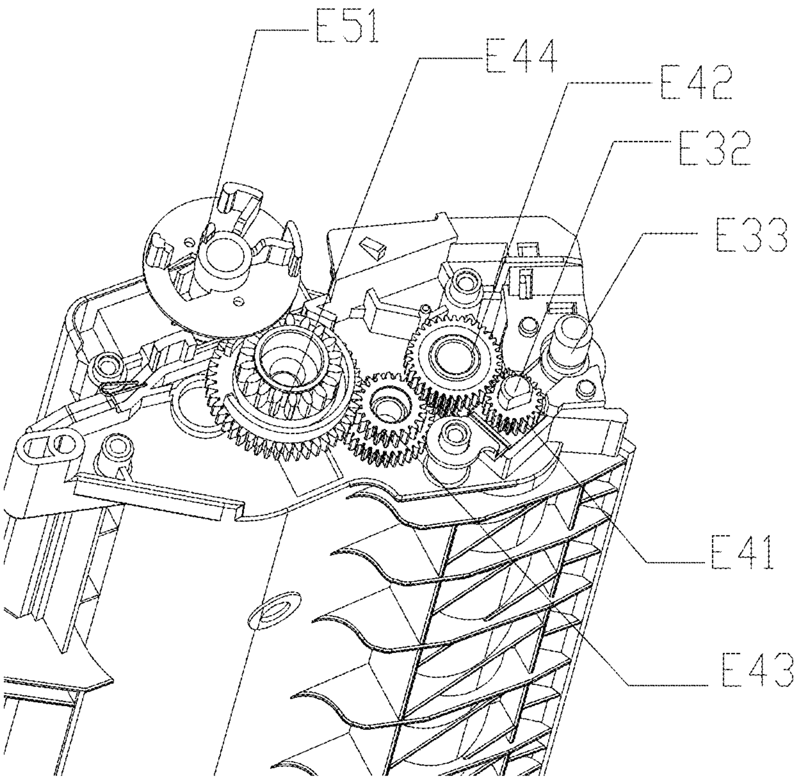
FIG. 55 is a stereoscopic view of a structure of a gear set at one end of an activation member in Embodiment 13.

As shown in FIG. 55, the developing cartridge includes a developing supply roller E32 and a developing roller E33, and all these rotating rollers may receive power from the one end of the two ends of the developing cartridge in the length direction and transmit it to the other end. Preferably, in the present embodiment, a second gear E42 and the developing supply roller E32 are coaxially provided and fixed on the developing supply roller E32. A third gear E42, a fourth gear E43 and a fifth gear E44 are two-stage gears, and the third gear E42 engages with the second gear E41 and the fourth gear E43, the fourth gear E43 engages with the third gear E42 as well as the fifth gear E44, and the fifth gear E44 engages with the fourth gear E43, at the same time, engages with a detection gear E51. When the power is transmitted from the developing supply roller E32, it passes through the second gear E41, the third gear E42, the fourth gear E43 and the fifth gear E44, and finally transmitted to a detect gear E51. In the present embodiment, the detect gear is the activation member, and the third gear, the fourth gear and the fifth gear are the transmission structure.

Embodiment 14

The present embodiment is a further improvement based on Embodiment 13, and mainly optimizes the gear set at one end of the power reception member of the developing cartridge, and reduces the number of parts, thereby reducing the cost.

Figure 56:
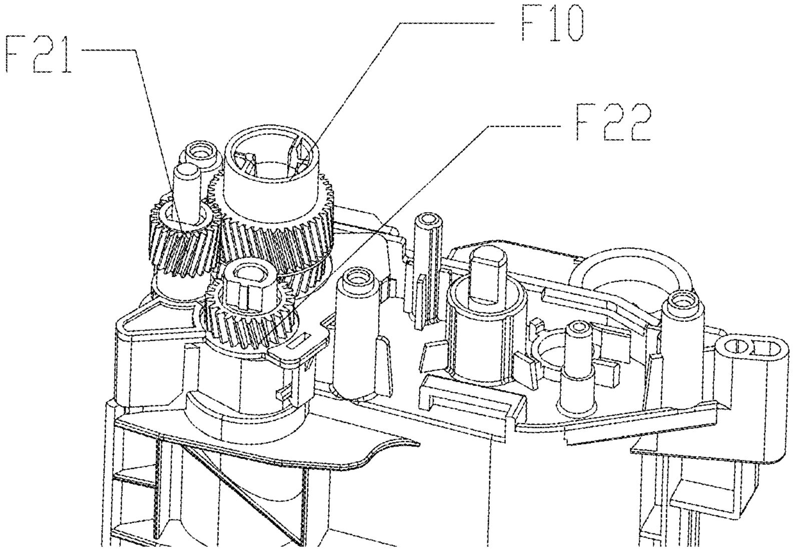
FIG. 56 is a schematic structural diagram of a gear set at one end of a power reception member in Embodiment 14.
Figure 57:
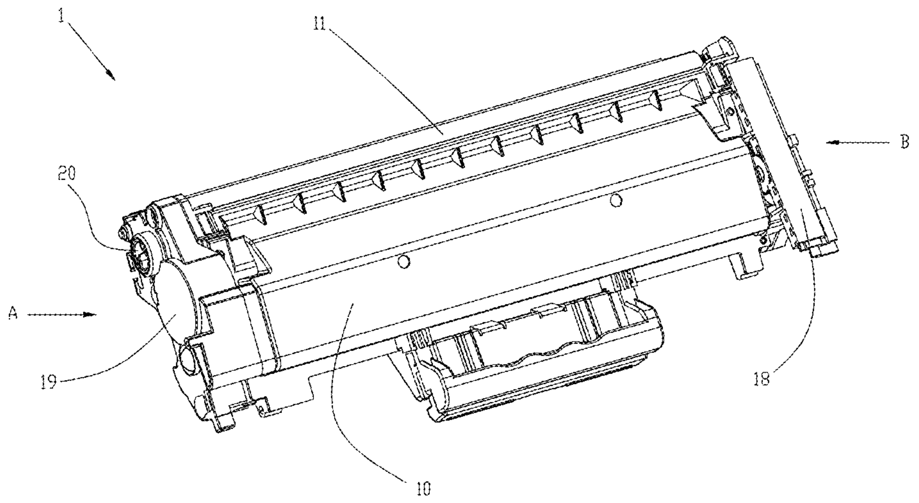
FIG. 57 is a stereoscopic view of a developing cartridge in Embodiment 15.

As shown in FIG. 56, the driving of the agitator member from the gear set at one end of the power reception member is eliminated in the present embodiment, so as to achieve the effect of reducing parts and saving assembly time.

In the present embodiment, the transmission process of the developing cartridge is as follows: first, the power reception member F10 receives the rotational driving power from the electronic imaging apparatus; next, the power reception member F10 drives the developing roller and the developing supply roller to rotate by engaging with a developing roller gear F21 and a first gear F22; then, the developing supply roller transmits power to the gear set at one end of the detect gear, and transmits power to the fifth gear E41 (see FIG. 55) and the detect gear (see FIG. 55). The fifth gear E44 is connected with the agitator member through a shaft, so as to achieve a function of driving the agitator member to rotate. Therefore, even if the number of the gear is reduced and the process and time of the assembly is reduced, the whole function of the developing cartridge is completed.

Embodiment 15

Unspecified parts in the present embodiment are the same as those of the foregoing embodiments. The present embodiment relates two technical solutions as follows: one technical solution is that, in order to solve the problem that the rack is too long, the rack is made into two parts that can be extended, and the other technical solution is that, in order to solve the problem that when some type of the developing cartridge is detected by the electronic imaging apparatus, the transmission structure is designed to accelerate the rack forward.

Figure 58:
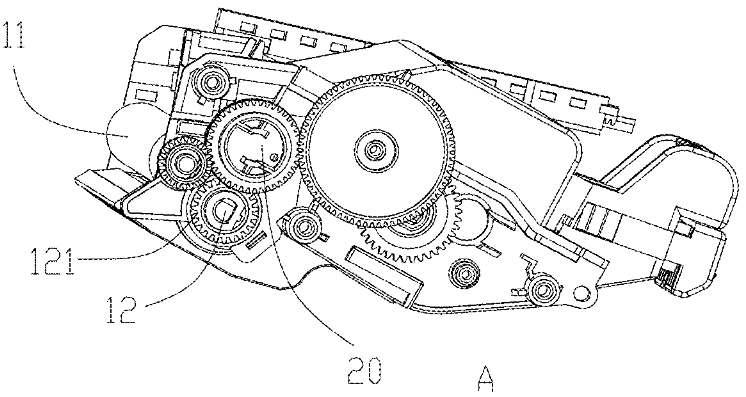
FIG. 58 is a schematic structural diagram of a transmission part after removing a protecting cover from the developing cartridge in Embodiment 15.

As shown in FIG. 58, the developing cartridge includes two ends in the length direction, which are an A end and a B end. The developing cartridge 1 includes: a cartridge 10, a developing roller 11, a developing supply roller 12, an end cover 18, a protecting cover 19 and a power reception member 20. The end cover 18 may be independently and detachedly connected with the protecting cover 19. Among them, the A end is provided with the power reception member 20 used to receive power from the electronic imaging apparatus; and the B end is provided with a first rack 30 and a second rack 40, which are used to contact with the detection part in the electronic imaging apparatus.

As shown in FIG. 58, the developing cartridge receives the rotational power from the electronic imaging apparatus through the power reception member 20, and transmits the power to the developing supply roller through a first gear 121 which is clamped at one end of the shaft of the developing supply roller 12, and then drives a second gear 122 which is clamped at the other end of the shaft of the developing supply roller 12 to rotate.

Figure 59:
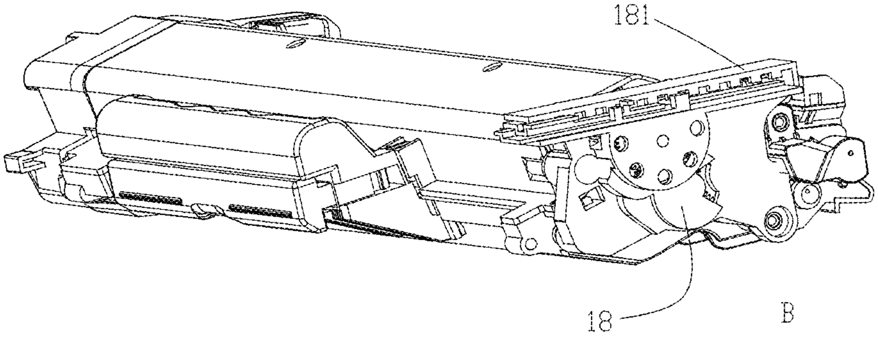
FIG. 59 is a stereoscopic view of an end B of the developing cartridge in Embodiment 15.
Figure 60:
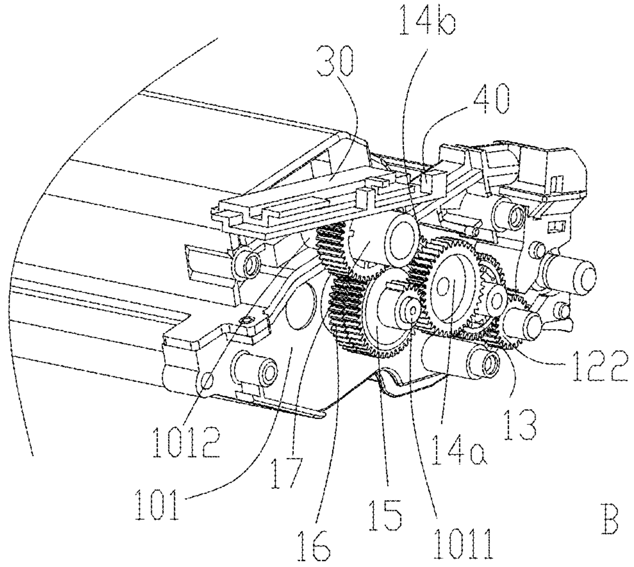
FIG. 60 is a schematic structural diagram of a gear set after removing an end cover from the developing cartridge in Embodiment 15.

As shown in FIG. 59 and FIG. 60, the end cover 18 is provided with a guide rail 181, and the first rack 30 and the second rack 40 are both provided in the guide rail 181. A side wall 101 at the B end of the cartridge is provided with a first positioning pillar 1011 and a second poisoning pillar 1012; and the developing cartridge 1 includes: a first intermediate gear 13, a third idle gear 14*a*, a second idle gear 14*b*, a hysteresis gear 15, a first idle gear 16 and a driving gear 17. Among them, the third idle gear 14*a* is coaxially provided with the second idle gear 14*b*.

Figure 61:
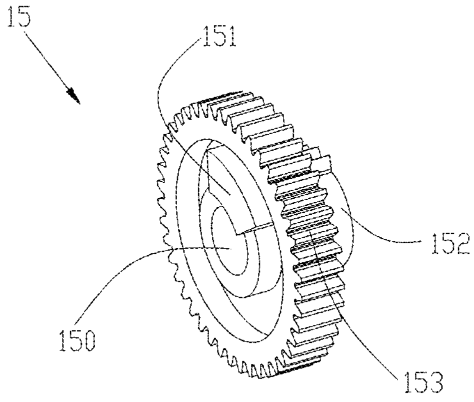
FIG. 61 is a stereoscopic view of a hysteresis gear of the developing cartridge in Embodiment 15.
Figure 62:
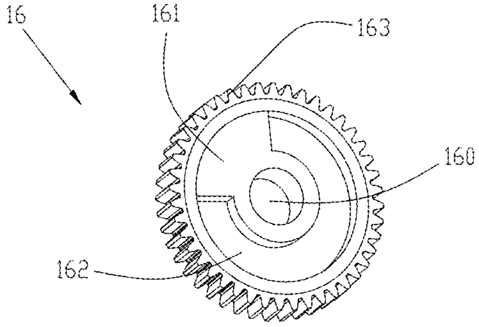
FIG. 62 is a stereoscopic view of a fourth gear of the developing cartridge in Embodiment 15.

As shown in FIG. 61 and FIG. 62, the hysteresis gear 15 includes: a first through hole 150, a first protrusion 151, a pinion portion 152 and a large gear portion 153; and the first idle gear 16 includes: a second through hole 160, a second protrusion 161, an engaging groove 162 and a first gear portion 163. Among them, the first gear portion 163 of the first idle gear 16 engages with the second idle gear 14*b*.

Where the first through hole 150 and the second through hole 160 are clamped at the first positioning pillar 1011 in turn, the driving gear 17 is installed in the second positioning pillar 1012, so as to enable the hysteresis gear 15, the first idle gear 16 and the driving gear 17 to be fixedly connected on the cartridge 10.

Figure 63:
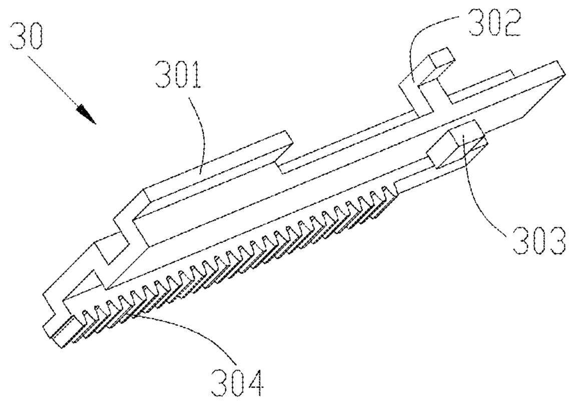
FIG. 63 is a stereoscopic view of a first rack of the developing cartridge in Embodiment 15.
Figure 64:
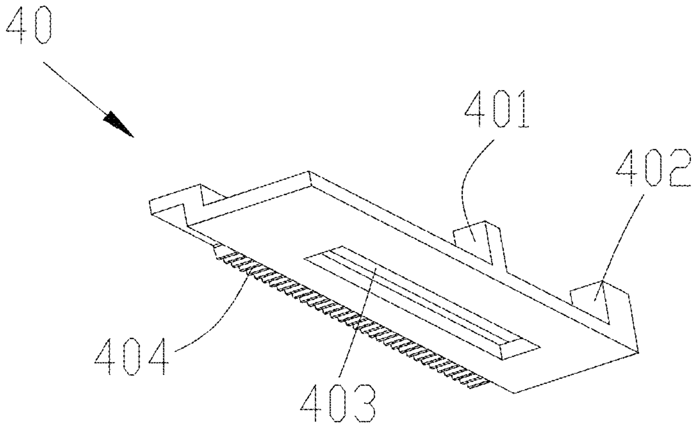
FIG. 64 is a stereoscopic view of a second rack of the developing cartridge in Embodiment 15.

As shown in FIG. 63 and FIG. 64, the first rack 30 includes: a first detection protrusion 301, a second detection protrusion 302, a third protrusion 303 and a first tooth portion 304. The second rack 40 includes: a third detection protrusion 401, a fourth detection protrusion 402, a transmission groove 403 and a second tooth portion 404. Among them, the third protrusion 303 is clamped in the transmission groove 403 and may move in the transmission groove 403 to enable the first rack 30 and the second rack 40 to move relatively. The positions of the transmission groove and the third protrusion can be interchanged.

Figure 65:
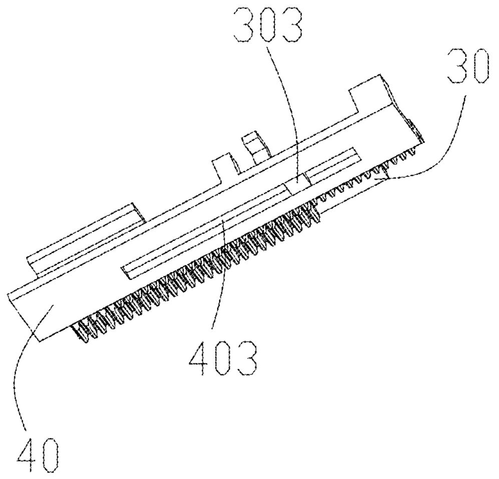
FIG. 65 is a schematic structural diagram of a rack in an initial position in Embodiment 15.
Figure 66:
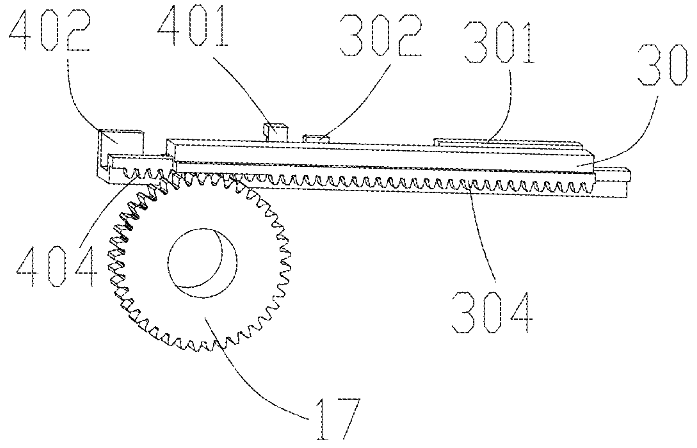
FIG. 66 is a schematic structural diagram of the rack in the initial position engaging with a transmission gear in Embodiment 15.

As shown in FIG. 65 and FIG. 66, the rack is at the initial position, when the developing cartridge dose not receive the rotational driving power, the third protrusion 303 is located in the transmission groove 403, the first tooth portion 304 of the first rack 30 does not engage with the driving gear 17, and a part of the second tooth portion 404 of the second rack 40 engages with the driving gear 17.

The developing cartridge receives the rotational driving power from the electronic imaging apparatus by the power reception member 20, and transmits the power to the gear set of the B end of the developing cartridge by the second gear 122 of the developing supply roller 12. The second gear 122 transmits the rotational driving power to the first idle gear 13 engaged therewith, and further transmits the rotational driving power to the second idle gear 14*b* engaged with the first idle gear 13. The second idle gear 14*b* transmits the rotational driving power received from the first idle gear 13 to the first idle gear 16, and drives the first idle gear 16 to rotate.

When the first idle gear 16 rotates, the second protrusion 161 also rotates, gradually rotates to a position where it is in contact with the first protrusion 151 of the hysteresis gear 15 clamped in the engaging groove 162, and then drives the hysteresis gear 15 to rotate. Due to the process needs certain buffer time, the hysteresis gear 15 rotates lagging relative to the first idle gear 16. When the hysteresis gear rotates, the driving gear 17 engaged therewith also rotates, so as to drive the second rack 40 to move, at this time, the first rack 30 dose not move relative to the driving gear 17.

The first rack 30 and the second rack 40 are connected in a sliding way, the first rack 30 lags behind the second rack 40, the second rack 40 moves under the drive of the driving gear 17, and then the second rack 40 drives the first rack 30 to connect with a driving gear 1730, so that the first rack 30 may directly receive driving power from the driving gear 17 to move in a translation way instead of being driven by the second rack 40.

Figure 67:
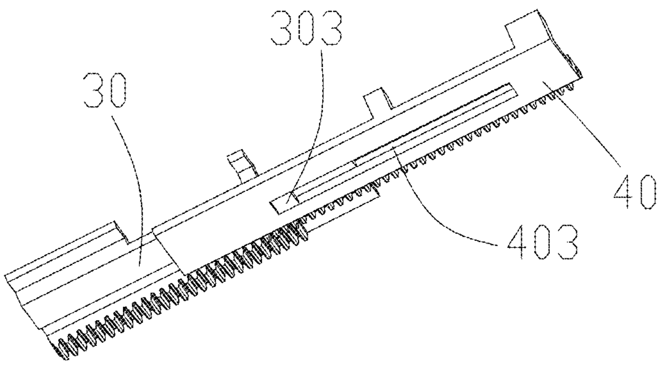
FIG. 67 is a schematic structural diagram of the rack in a middle position in Embodiment 15.
Figure 68:
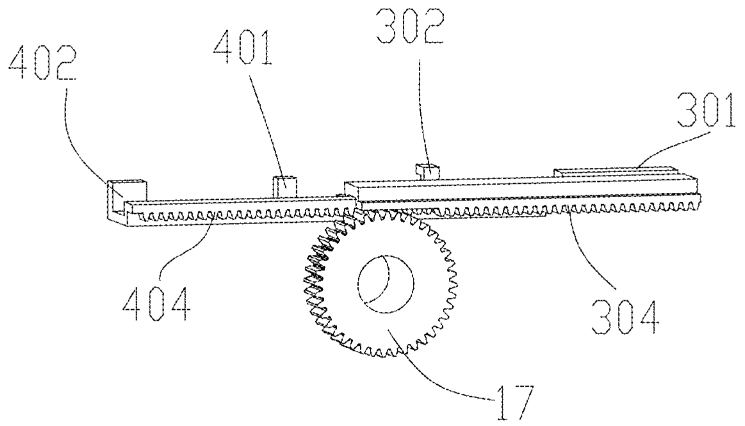
FIG. 68 is a schematic structural diagram of the rack in the middle position engaging with the transmission gear in Embodiment 15.

As shown in FIG. 67 and FIG. 68, when the rack is at a middle position, an end of the transmission groove 403 moves to a position abutted with the third protrusion 303, meanwhile the second tooth portion 404 of the second rack 40 moves a certain distance relative to the driving gear 17, and the first tooth portion 304 of the first rack 30 is still in a state not engaged with the driving gear 17.

During the second rack 40 moves from the initial position to the middle position, the detection part of the electronic imaging apparatus is in contact with the third detection protrusion 401 and the fourth detection protrusion 402 of the second rack 40, and continuously goes through the process of contact, separation, re-contact, and re-separation between the detection part and the detection protrusion.

When the rack is at the middle position, the second rack 40 no longer receives driving power and stops moving, and the first rack 30 is still connected with the driving gear 17, that is, the first rack 30 may still receive the driving power to move.

Figure 69:
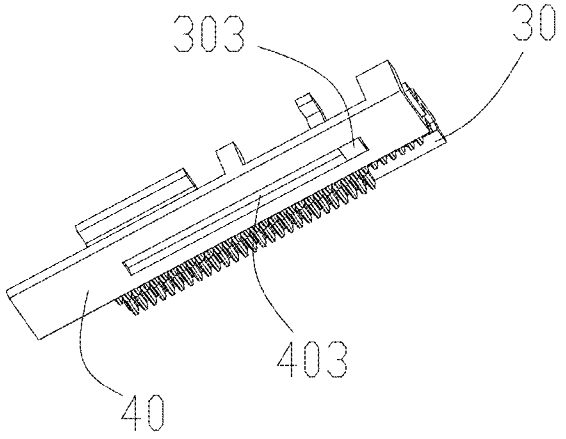
FIG. 69 is a schematic structural diagram of the second rack in a last position in Embodiment 15.
Figure 70:
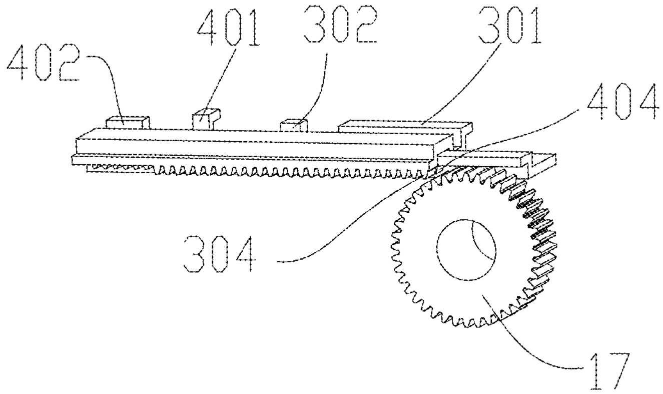
FIG. 70 is a schematic structural diagram of the second rack in the last position engaging with the transmission gear in Embodiment 15.

As shown in FIG. 69 and FIG. 70, after the hysteresis gear 15 receives the rotational driving power from first idle gear 16, the pinion portion 152 of the hysteresis gear 15 gradually rotates to engage with the third idle gear 14*a*, so as to drive the hysteresis gear 15 to rotate in an accelerated way, so as to further drive both the hysteresis gear 15 and the driving gear 17 engaged therewith to rotate in an accelerated way.

Due to the accelerated rotation of the driving gear 17, the first rack 30 gradually moves form the position engaged with the driving gear 17 to the position disengaged with the driving gear 17, at this time, the first rack also stops to move, and the rack reaches to the last position. After the driving gear 17 completes the acceleration, the first rack 30 completely disengages with the driving gear 17, that is, a last tooth of the first tooth portion 304 of the first rack 30 is flushed with a last tooth of the second tooth portion 404 of the second rack 40, the first rack 30 and the second rack 40 are both disengaged with the driving gear 17 at the same time. Meanwhile, the third protrusion 303 moves to the position abutted against the front end of the transmission groove 403. When the rack is at the last position, the swing lever of the electronic imaging apparatus is always in contact with the detection protrusion.

The first rack 30 and the second rack 40 are overlapped and in a folded state, and the first rack 30 and the second rack 40 move in the same direction sequentially, so that the first rack 30 and the second rack 40 are in a unfolded state, and the unfolded first rack may also be driven in the same direction, thus the first rack 30 and the second rack 40 are in the folded state again, thereby reducing the size of the developing cartridge 1, and further reducing the cost.

Finally, it should be noted that the above embodiments are only used to illustrate the technical solutions of the present application, rather than limiting them; Although the application has been described in detail with reference to the foregoing embodiments, those of ordinary skilled in the art should understand that they can still modify the technical solutions described in the foregoing embodiments, or equivalently replace some or all of the technical features. And these modifications or replacements do not cause the essence of the corresponding technical solutions to deviate from the scope of the technical solutions of the embodiments of the present application.

What is claimed is:

1. A developing cartridge, comprising:

a cartridge containing a developer and including a first side wall and a second side wall positioned opposite to each other along a first direction;

a power reception member configured to receive a driving power and positioned at the first side wall;

a developing roller rotatable about a first axis extending in the first direction; and an activation member including a movable member and a detection protrusion positioned at the second side wall, wherein the movable member rotates around a second axis in a second direction, the first direction and the second direction intersect with each other, and the detection protrusion moves as the movable member moves.

2. The developing cartridge according to claim 1, further comprising:

a first gear positioned at the first side wall and driven by the driving power received by the power reception member to rotate about a third axis extending in the first direction.

3. The developing cartridge according to claim 1, further comprising:

a second gear rotatable about a fourth axis extending in the first direction, the second gear including a bevel gear part.

4. The developing cartridge according to claim 3, wherein:

the movable member as is rotated by the second gear.

5. The developing cartridge according to claim 1, further comprising:

an intermediate transmitting member positioned at the second side wall and moves as the movable member rotates.

6. The developing cartridge according to claim 5, wherein:

the intermediate transmitting member rotates about a fifth axis that is not parallel with the first direction.

7. The developing cartridge according to claim 6, wherein:

the intermediate transmitting member is a swing lever.

8. The developing cartridge according to claim 5, further comprising:

an elastic member, wherein one end of the first elastic member is connected to the intermediate transmitting member.

9. The developing cartridge according to claim 1, wherein:

the movable member includes a missing tooth part and a protrusion.

10. The developing cartridge according to claim 1, further comprising:

a conductive part positioned at the second side wall.

11. The developing cartridge according to claim 10, wherein:

the movable member is made of conductive material.

12. The developing cartridge according to claim 10, wherein:

the movable member is made of insulating material.

13. A developing cartridge, comprising:

a cartridge containing a developer and including a first side wall and a second side wall positioned opposite to each other along a first direction;

a power reception member configured to receive a driving power and positioned at the first side wall;

a developing roller rotatable about a first axis extending in the first direction; and an activation member including a movable member and a detection protrusion positioned at the second side wall;

wherein the detection protrusion moves as the movable member moves, and the movable member is a flexible member.

14. The developing cartridge according to claim 13, further comprising:

at least a portion of the movable member is located closer to the second side wall than the power reception member in the first direction.

15. The developing cartridge according to claim 13, further comprising:

a guide rail along which the movable member moves.

16. The developing cartridge according to claim 13, further comprising:

an electrode positioned at the second side wall.

* * * * *